(12) United States Patent
Fauteux et al.

(10) Patent No.: US 11,110,583 B2
(45) Date of Patent: Sep. 7, 2021

(54) POWER TOOLS WITH INTEGRATED CIRCUIT BOARDS

(71) Applicant: TTI (MACAO COMMERCIAL OFFSHORE) LIMITED, Macau (MO)

(72) Inventors: Denis Gaston Fauteux, Kwai Chung (HK); Hei Man Lee, Kwai Chung (HK); Yong Min Li, Dongguan (CN); Zhao Jun Shi, Dongguan (CN); Yi Jia Chang, Dongguan (CN); Li Hua Xie, Dongguan (CN)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 328 days.

(21) Appl. No.: 15/776,961

(22) PCT Filed: Nov. 18, 2016

(86) PCT No.: PCT/CN2016/106386
§ 371 (c)(1),
(2) Date: May 17, 2018

(87) PCT Pub. No.: WO2017/084614
PCT Pub. Date: May 26, 2017

(65) Prior Publication Data
US 2018/0326568 A1    Nov. 15, 2018

(30) Foreign Application Priority Data

Nov. 20, 2015 (HK) .................................. 15111479.0

(51) Int. Cl.
*B25F 5/02* (2006.01)
*B24B 23/02* (2006.01)
(Continued)

(52) U.S. Cl.
CPC .............. *B25F 5/02* (2013.01); *B24B 23/028* (2013.01); *B24B 23/06* (2013.01); *H02K 11/28* (2016.01);
(Continued)

(58) Field of Classification Search
CPC ....... B24B 23/06; B24B 23/028; B23D 49/16; B23D 45/16; B25D 2250/095;
(Continued)

(56) References Cited

U.S. PATENT DOCUMENTS 4,328,405 A * 5/1982 Cuneo .................... H01H 13/08
200/243
5,327,064 A * 7/1994 Arakawa ................ H02K 29/08
307/117
(Continued)

FOREIGN PATENT DOCUMENTS

DE    102011110971 A1 *  1/2013  ............. H02K 11/33
EP       2322327 A1       5/2011
(Continued)

OTHER PUBLICATIONS

European Patent Office Search Report for Application No. 16865791.4, dated Jun. 26, 2019, 8 pages.
(Continued)

*Primary Examiner* — Thomas M Wittenschlaeger
(74) *Attorney, Agent, or Firm* — Michael Best & Friedrich LLP

(57) ABSTRACT

A power tool which contains a casing, a brushless motor (22) mounted inside the casing, a user actuated switch (38) mounted on the casing, and a circuit board (32) mounted inside the casing. The brushless motor (22) is adapted to drive one or more movable parts in the power tool. The circuit board (32) is mechanically connected to the brushless motor (22) and the switch (38) at the same time. As only a
(Continued)

single, integrated circuit board (32) is configured in the power tool, the manufacturing cost is reduced and greater reliance and electrical safety can be achieved.

27 Claims, 37 Drawing Sheets

(51) Int. Cl.
    *B24B 23/06*     (2006.01)
    *H02K 11/28*     (2016.01)
    *H02K 11/33*     (2016.01)
    *H02K 7/14*     (2006.01)
    *H02K 11/215*     (2016.01)
    *B23D 45/16*     (2006.01)
    *B23D 49/16*     (2006.01)
    *B25B 21/00*     (2006.01)
    *B25B 21/02*     (2006.01)
    *B25D 11/06*     (2006.01)

(52) U.S. Cl.
    CPC ............. *H02K 11/33* (2016.01); *B23D 45/16* (2013.01); *B23D 49/16* (2013.01); *B25B 21/00* (2013.01); *B25B 21/02* (2013.01); *B25D 11/06* (2013.01); *B25D 2250/095* (2013.01); *B25D 2250/265* (2013.01); *H02K 11/215* (2016.01)

(58) Field of Classification Search
    CPC ... B25D 2250/265; B25D 11/06; B25B 21/02; B25B 21/00; B25F 5/02; H02K 11/33; H02K 11/28; H02K 11/215; H02K 7/145
    See application file for complete search history.

(56) References Cited

U.S. PATENT DOCUMENTS

| | | | | |
|---|---|---|---|---|
| 8,446,120 | B2 * | 5/2013 | Forster | H01H 9/063 318/503 |
| 8,513,838 | B2 * | 8/2013 | Toukairin | H02K 11/33 310/50 |
| 8,587,230 | B2 * | 11/2013 | Pant | H02P 23/20 318/400.01 |
| 8,810,085 | B2 * | 8/2014 | Matsunaga | H02K 11/33 310/50 |
| 9,126,316 | B2 * | 9/2015 | Oomori | B25B 21/02 |
| 9,948,162 | B2 * | 4/2018 | Nagahama | H02K 3/522 |
| 10,193,422 | B2 * | 1/2019 | Kouda | B25B 21/00 |
| 10,205,365 | B2 * | 2/2019 | Beyerl | H02K 29/08 |
| 10,326,337 | B2 * | 6/2019 | Omura | H02K 1/20 |
| 10,523,087 | B2 * | 12/2019 | Lewis | B24B 23/028 |
| 2006/0158049 | A1 * | 7/2006 | Suzuki | H02K 11/33 310/52 |
| 2011/0068642 | A1 * | 3/2011 | Takeyama | H02K 11/33 310/50 |
| 2012/0200181 | A1 | 8/2012 | Yoshida et al. | |
| 2013/0255981 | A1 * | 10/2013 | Noto | B25F 5/00 173/20 |
| 2013/0313925 | A1 | 11/2013 | Mergener et al. | |
| 2014/0001892 | A1 * | 1/2014 | Bekavac | H02K 11/33 310/50 |
| 2014/0361645 | A1 * | 12/2014 | Beyerl | B25B 21/00 310/50 |
| 2015/0022125 | A1 * | 1/2015 | Takano | B25F 5/008 318/139 |
| 2015/0097641 | A1 * | 4/2015 | Chen | B25F 5/02 335/126 |
| 2015/0279592 | A1 * | 10/2015 | Ekstrom | B23Q 5/041 200/522 |
| 2015/0280516 | A1 * | 10/2015 | Ekstrom | B23Q 5/041 173/93 |

FOREIGN PATENT DOCUMENTS

| | | |
|---|---|---|
| EP | 2433757 A2 | 3/2012 |
| EP | 2524773 A2 | 11/2012 |
| EP | 2581168 A1 | 4/2013 |
| WO | 2010035547 A1 | 4/2010 |

OTHER PUBLICATIONS

Australian Patent Office Examination Report for Application No. 2016355627, dated May 7, 2019, 4 pages.
Australian Patent Office Examination Report for Application No. 2016355627, dated Jul. 17, 2019, 3 pages.
European Patent Office Extended Search Report for Application No. 17902256.1 dated Oct. 14, 2020 (9 pages).
International Search Report and Written Opinion for Application No. PCT/CN2016/106386 dated Feb. 22, 2017, 8 pages.

* cited by examiner

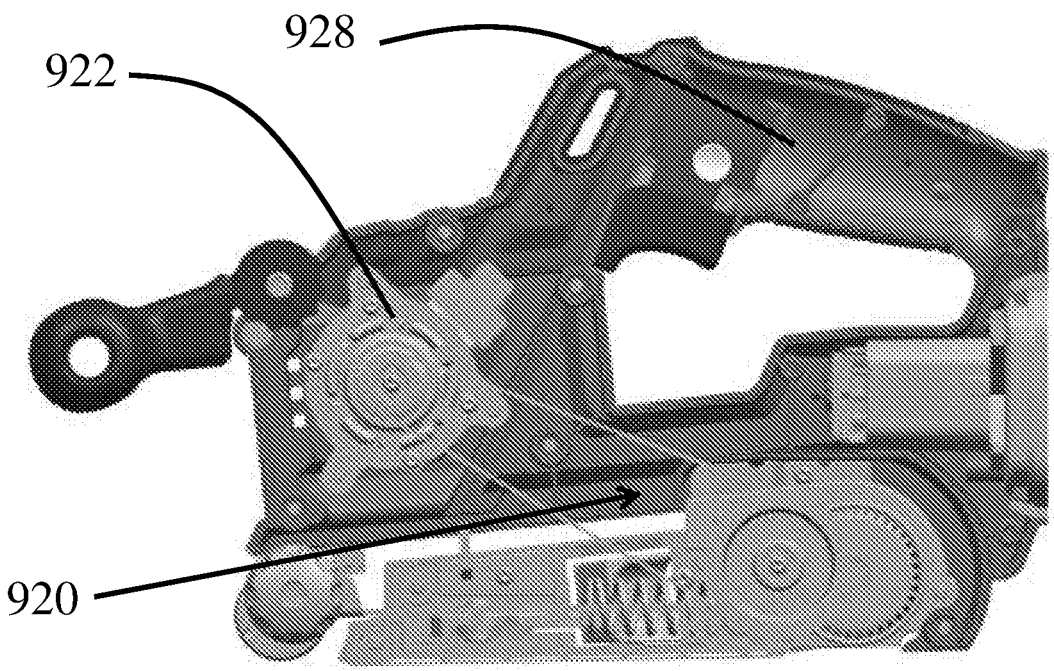
Fig.13a
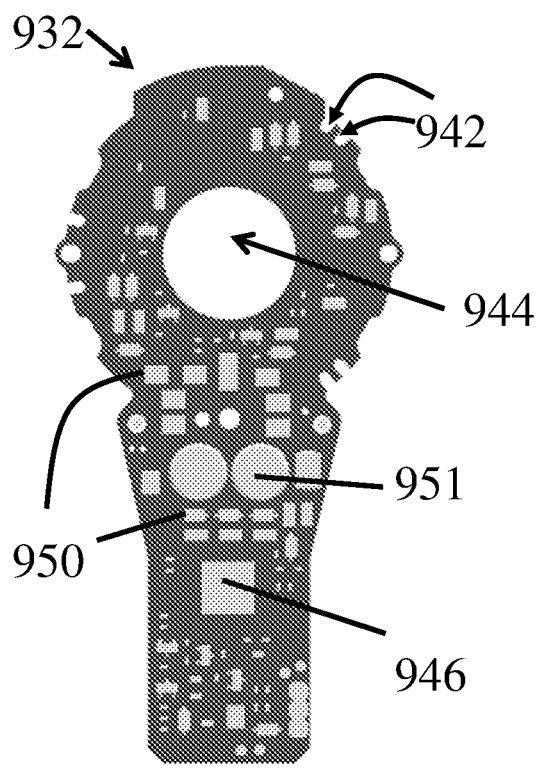 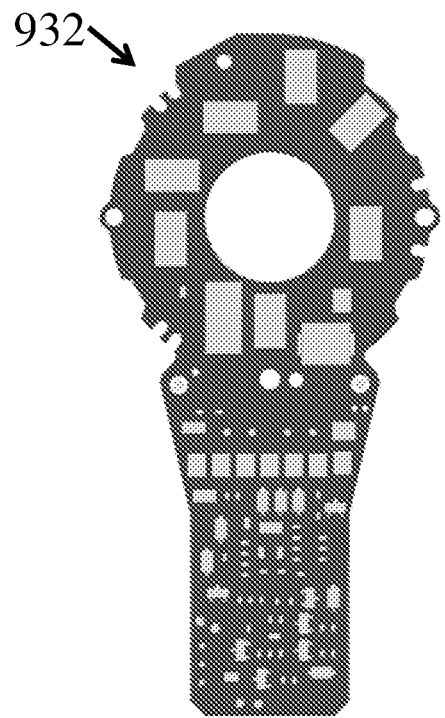
Fig.13b            Fig.13c

POWER TOOLS WITH INTEGRATED CIRCUIT BOARDS

FIELD OF INVENTION

This invention relates to electric power tools, and in particular battery-powered power tools with brushless motor and their internal structures.

BACKGROUND OF INVENTION

Electric power tools are widely used in various applications such as building, construction and interior decoration. These power tools provide necessary tool functions to the user using the driving power generated by the on-board drive motor. At the same time, the power tools are usually manufactured to be compact and light-weight, so that the user has no difficulty in carrying and manipulating them.

However, the internal structures of traditional power tools are usually complicated and are somehow made disorderly. For example, in some power tools there are multiple circuit boards serving different purposes which are configured inside the power tool casing, and different connection means such as fly wires are used to electrically route the electrical signals between these circuit boards. Such internal designs often result in a large and unnecessary occupation of internal space of the casing, leading to degraded electric characteristics, and the manufacturing costs can be quite high.

SUMMARY OF INVENTION

In the light of the foregoing background, it is an object of the present invention to provide an alternate power tool design which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a power tool including a casing, a brushless motor mounted inside the casing, a user actuated switch mounted on the casing, and a circuit board mounted inside the casing. The brushless motor is adapted to drive one or more movable part in the power tool. The circuit board is integrated with a motor controller for the brushless motor, and a microcontroller for controlling operation of the power tool.

Preferably, the brushless motor further includes a drive shaft defining an axial direction. The circuit board is secured to the brushless motor in a way such that the circuit board is perpendicular to the axial direction.

In one specific implementation, the casing contains a main portion extending substantially along the axial direction, and a handle portion connected and extending from the main portion along a direction not parallel with the axial direction. The circuit board further contains a first portion and a second portion which are accommodated in the main portion and the handle portion respectively.

Preferably, the circuit board further contains a plurality of vias which are adapted to receive struts and electric conducting pins on the brushless motor, such that the circuit board is securely mounted on the brushless motor and electrically connected thereto.

In a variation, the circuit board further contains a plurality of vias which are adapted to receive struts formed on the casing, such that the circuit board is securely mounted on the casing.

In another variation, wherein the circuit board further contains a conducting pad which is in direct contact with the switch, where the switch is electrically connected with the conducting pad.

In a further variation, the first portion of the circuit board is in a circular shape with a through hole at its center to allow the drive shaft to pass. The second portion of the circuit board is in a rectangular shape.

In one implementation, the power tool contains a trigger configured on the casing and exposed to the outside. The trigger is mechanically connected to the switch.

In another implementation, the circuit board further contains a plurality of surface-mount elements configured on a surface of the circuit board.

In a further implementation, the circuit board is directly connected to the brushless motor or the switch without any intermediate electric wires.

In yet another implementation, a heat sink is mounted on the circuit board.

In yet another implementation, the circuit board is the only circuit board in the power tool.

In yet another implementation, a Hall sensor, a power control device, and a logic controller are integrated into the circuit board.

According to another aspect of the present invention, there is provided a power tool which contains a casing, a drive motor mounted inside the casing, a user actuated switch mounted on the casing, and a circuit board mounted inside the casing. The drive motor is adapted to drive one or more movable part in the power tool. The circuit board is mechanically connected to the drive motor and the switch at the same time.

Preferably, the circuit board is directly connected to the drive motor or the switch without any intermediate electric wires.

More preferably, the drive motor further includes a drive shaft defining an axial direction. The circuit board is secured to the drive motor in a way such that the circuit board is perpendicular to the axial direction.

In one specific implementation, the casing contains a main portion extending substantially along the axial direction, and a handle portion connected and extending from the main portion along a direction not parallel with the axial direction. The circuit board further contains a first portion and a second portion which are accommodated in the main portion and the handle portion respectively.

Preferably, the circuit board further contains a plurality of vias which are adapted to receive struts and electric conducting pins on the drive motor, such that the circuit board is securely mounted on the drive motor and electrically connected thereto.

In a variation, the circuit board further contains a plurality of vias which are adapted to receive struts formed on the casing, such that the circuit board is securely mounted on the casing.

In another variation, wherein the circuit board further contains a conducting pad which is in direct contact with the switch, where the switch is electrically connected with the conducting pad.

In a further variation, the first portion of the circuit board is in a circular shape with a through hole at its center to allow the drive shaft to pass. The second portion of the circuit board is in a rectangular shape.

In one implementation, the power tool contains a trigger configured on the casing and exposed to the outside. The trigger is mechanically connected to the switch.

In another implementation, the circuit board further contains a plurality of surface-mount elements configured on a surface of the circuit board.

In yet another implementation, the circuit board is the only circuit board in the power tool.

In yet another implementation, a Hall sensor, a power control device, and a logic controller are integrated into the circuit board.

In yet another implementation, a heat sink is mounted on the circuit board.

According to a further aspect of the present invention, there is provided a power tool which contains a casing, a drive motor mounted inside the casing, a user actuated switch mounted on the casing, and a circuit board mounted inside the casing. The drive motor is adapted to drive one or more movable part in the power tool. The circuit board is the only circuit board in the power tool.

Preferably, the drive motor further includes a drive shaft defining an axial direction. The circuit board is secured to the drive motor in a way such that the circuit board is perpendicular to the axial direction.

In one specific implementation, the casing contains a main portion extending substantially along the axial direction, and a handle portion connected and extending from the main portion along a direction not parallel with the axial direction. The circuit board further contains a first portion and a second portion which are accommodated in the main portion and the handle portion respectively.

Preferably, the circuit board further contains a plurality of vias which are adapted to receive struts and electric conducting pins on the drive motor, such that the circuit board is securely mounted on the drive motor and electrically connected thereto.

In a variation, the circuit board further contains a plurality of vias which are adapted to receive struts formed on the casing, such that the circuit board is securely mounted on the casing.

In another variation, wherein the circuit board further contains a conducting pad which is in direct contact with the switch, where the switch is electrically connected with the conducting pad.

In a further variation, the first portion of the circuit board is in a circular shape with a through hole at its center to allow the drive shaft to pass. The second portion of the circuit board is in a rectangular shape.

In one implementation, the power tool contains a trigger configured on the casing and exposed to the outside. The trigger is mechanically connected to the switch.

In another implementation, the circuit board further contains a plurality of surface-mount elements configured on a surface of the circuit board.

In yet another implementation, the circuit board is mechanically connected to the drive motor and the switch at the same time In yet another implementation, the circuit board is directly connected to the drive motor or the switch without any intermediate electric wires.

In yet another implementation, a Hall sensor, a power control device, and a logic controller are integrated into the circuit board.

In yet another implementation, a heat sink is mounted on the circuit board.

There are many advantages to the present invention, and apparently the major advantage is that the internal structure of the power tool related to the electrical connections is much simplified. As there is only one circuit board in the power tool, and that the circuit board connects directly to the drive motor and the user actuated switch, there is no need to use any additional electric wire for connections between the motor/trigger to the circuit board, which not only make the internal layout of the casing tidy and clear, but also reduces possible electrical failure chances.

Also, as the circuit board in the present invention is mounted directly to the drive motor and the user actuated switch, the manufacturing cost is lowered. By implementing surface-mount elements (SMT) on the circuit board, the manufacturing cost is further lowered in relation to components costs and the assembly costs.

BRIEF DESCRIPTION OF FIGURES

The foregoing and further features of the present invention will be apparent from the following description of preferred embodiments which are provided by way of example only in connection with the accompanying figures, of which:

FIGS. 8b and 8c show respectively two circuit boards configured in the jig saw in FIG. 8a.

FIGS. 9b and 9c show respectively two circuit boards configured in the hammer drill in FIG. 9a.

FIG. 9d illustrates the electric wire connections between various parts in the hammer drill in FIG. 9a.

FIG. 10b is the front view of the circuit board configured in the impact wrench in FIG. 10a.

FIG. 10c illustrates the electric wire connections between various parts in the impact wrench in FIG. 10a.

FIG. 11b is the front view of the circuit board configured in the hammer drill in FIG. 11a.

FIG. 11c illustrates the electric wire connections between various parts in the hammer drill in FIG. 11a.

FIG. 12b is the front view of the circuit board configured in the hammer drill in FIG. 12a.

FIG. 12c illustrates the electric wire connections between various parts in the hammer drill in FIG. 12a.

FIG. 13a shows a part of the internal structure of a belt sander according to another embodiment of the present invention.

FIGS. 13b and 13c show respectively a front side and a back side of a circuit board configured in the belt sander in FIG. 13a.

FIG. 13d illustrates the electric wire connections between various parts in the belt sander in FIG. 13a.

FIGS. 14b and 14c show respectively two circuit boards configured in the angle grinder in FIG. 14a.

FIG. 14d illustrates the electric wire connections between various parts in the angle grinder in FIG. 14a.

FIG. 15b shows a partial view of the internal structure of the trim router in FIG. 15a.

FIG. 15c shows a circuit board configured in the trim router in FIG. 15a.

FIG. 15d illustrates the electric wire connections between various parts in the trim router in FIG. 15a.

FIGS. 16b and 16c show the front and rear views of the first circuit board in the belt sander of FIG. 16a.

FIGS. 16d and 16e show the front and rear views of the second circuit board in the belt sander of FIG. 16a.

FIG. 16f shows the electric wire connections between various parts in the belt sander in FIG. 16a.

FIG. 17b shows the electric wire connections between the motor and various parts in the air compressor of FIG. 17a.

FIGS. 17c and 17d illustrate respectively two circuit boards configured in the air compressor of FIG. 17a.

FIG. 17e illustrates the electric wire connections between various components including the battery packs in the air compressor of FIG. 17a.

FIG. 18b shows the front view of a circuit board configured in the hammer drill of FIG. 18a.

FIG. 18c shows the electric wire connections between various parts in the hammer drill of FIG. 18a.

FIG. 19b shows the front view of a circuit board configured in the circular saw of FIG. 19a.

FIG. 19c shows the electric wire connections between various parts in the circular saw of FIG. 19a.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
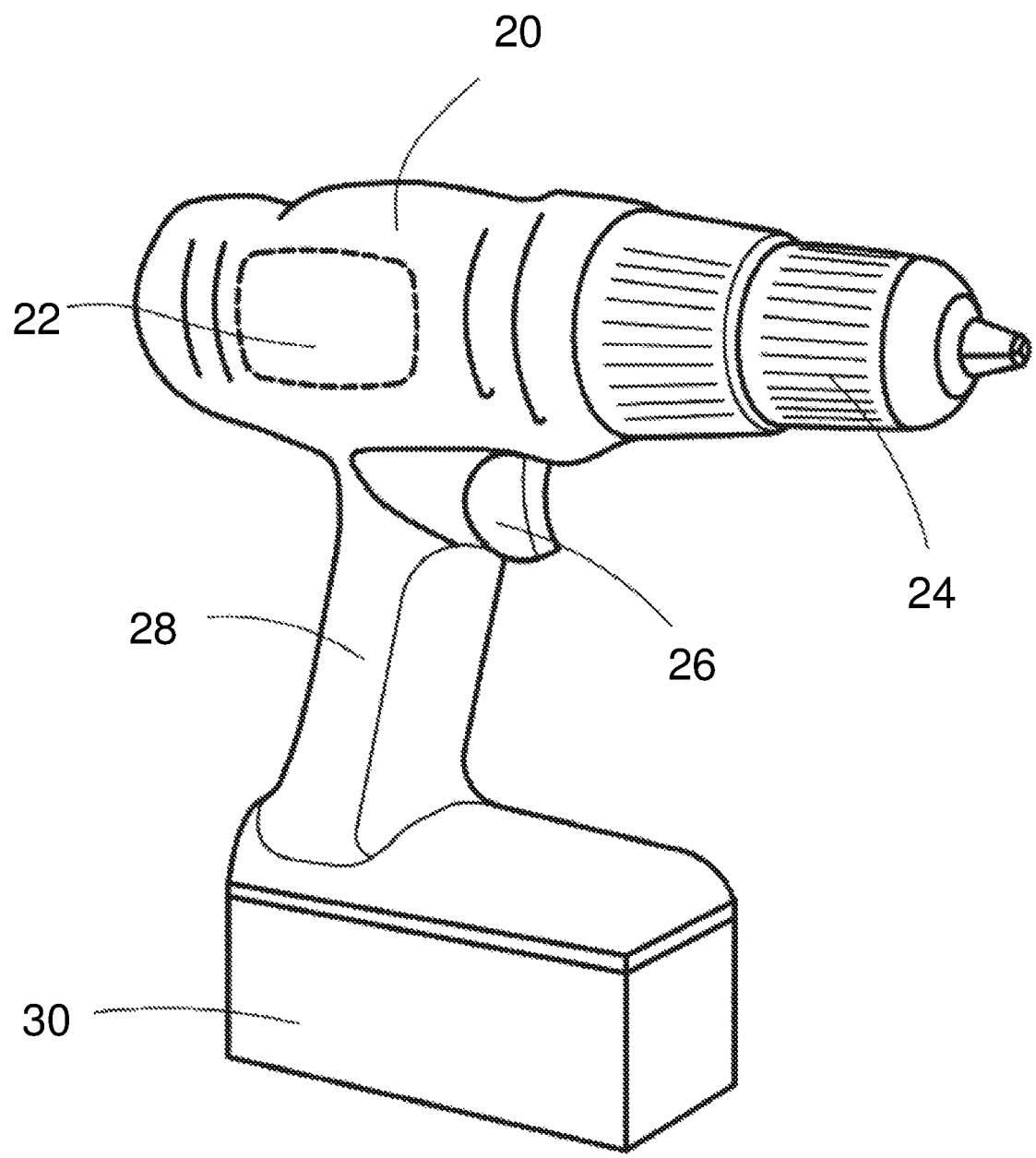
FIG. 1 is a perspective view of a handheld power tool according to a first embodiment of the present invention.

Referring now to FIG. 1, the first embodiment of the present invention is a power tool which is designed to be handheld. As shown in the drawing the power tool is an electric drill/screwdriver. The power tool has a casing which contains a main portion 20 and a handle portion 28. There is an electric drive motor 22 mounted inside the main portion 20, and the drive motor 22 is configured to driving one or more movable parts in the power tool, such as any intermediate gear mechanism (not shown) and ultimately the tool bit holder 24. The main portion 20 extends substantially along an axial direction defined by the motor shaft (not shown) of the drive motor 22. The handle portion 28 is connected to and extends from the main portion along a substantially downward direction, but which is inclined from the vertical direction perpendicular to the axial direction. A trigger 26 is configured on the handle portion 28 where the trigger 26 is exposed to the outside for the user's manipulation to turn on/off the power tool. At the bottom of the handle portion 28, there is a battery pack 30 which is detachably connected to the power tool to supply power to the electrical circuit inside the power tool.

Figure 2:
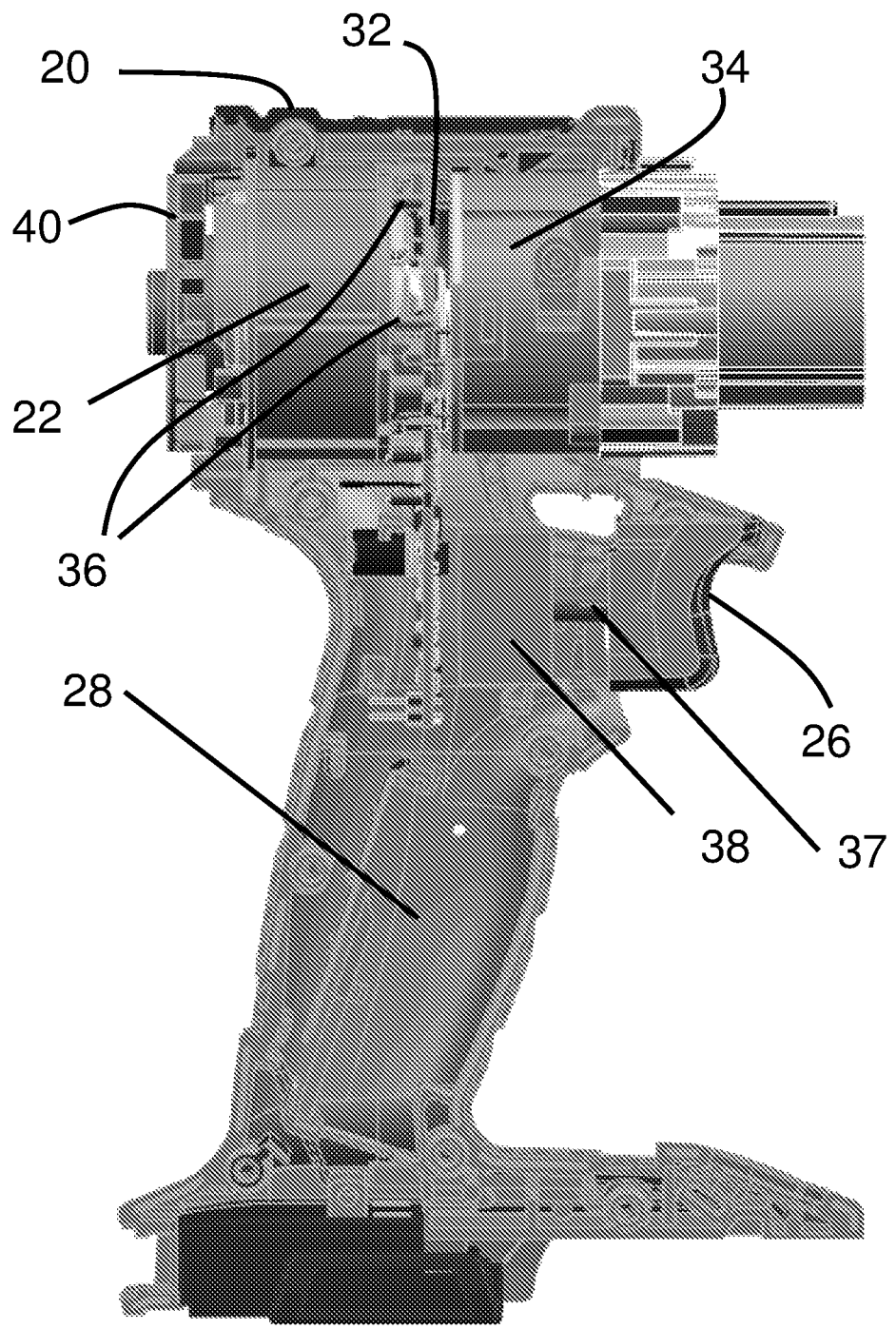
FIG. 2 shows the cross-sectional view of the power tool in FIG. 1 along a vertical plane.
Figure 3:
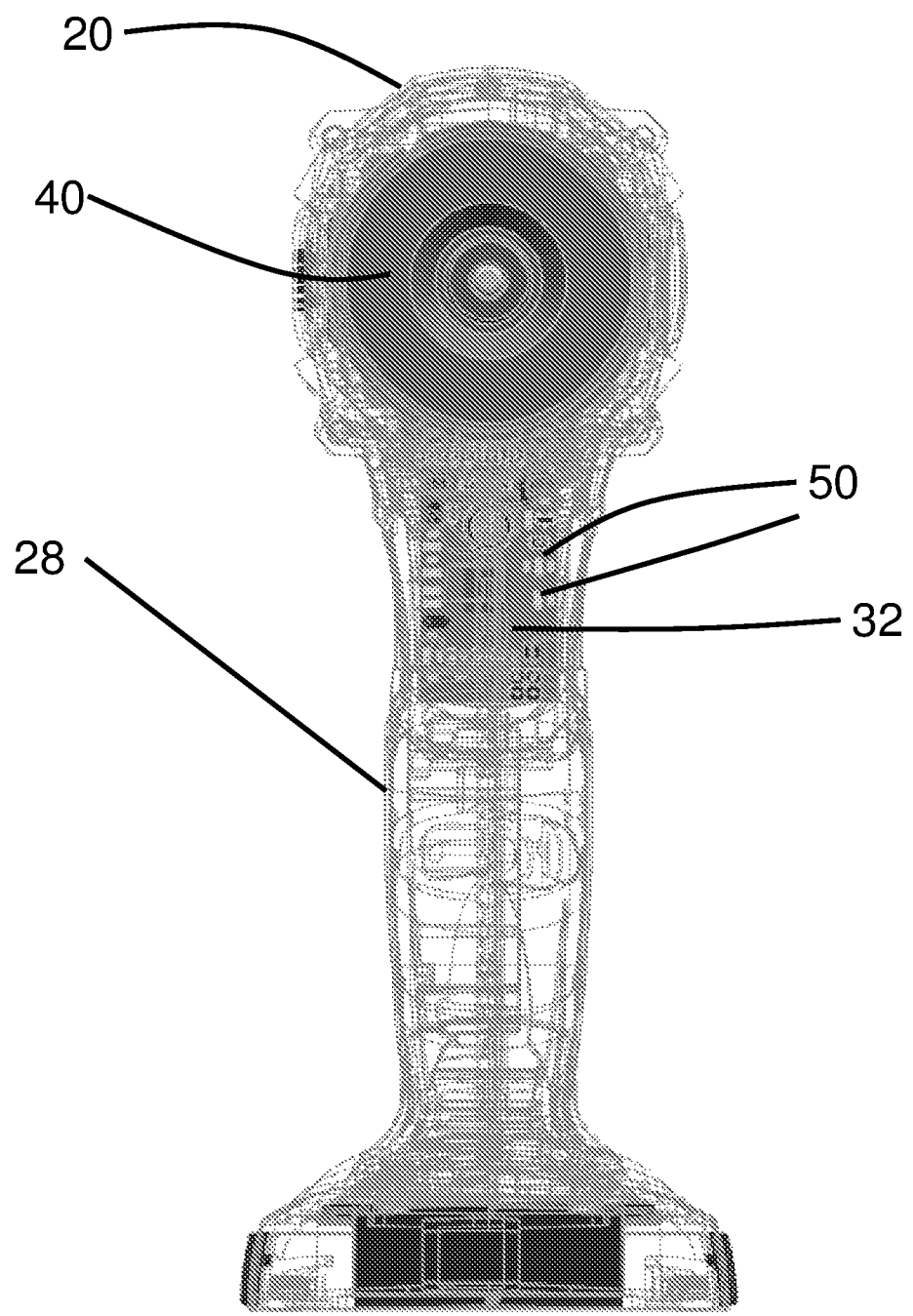
FIG. 3 illustrates the position of a circuit board in the power tool in FIG. 1 when viewed from the rear side of the power tool.

Turning now to FIGS. 2-3. The drive motor 22, a gear mechanism 34 and the main portion 20 are all arranged along the axial direction of the motor shaft (not shown). The drive motor 22 is a brushless DC motor, which is located at the rear end of the main portion 20 and covered by an end cap 40 of the main portion 20. The gear mechanism 34 is provided in front of the drive motor 22, and the gear mechanism 34 is used to convert the motor output to a different rating, for example with larger torque and lower speed, as skilled persons would appreciate. Between the drive motor 22 and the gear mechanism 34 a circuit board 32 is placed, which extends along the direction perpendicular to the motor shaft axial direction. The circuit board 32 is mounted to the casing and the drive motor 22 by having one or more struts 36 extending from the casing and the drive motor 22 into corresponding vias 42 (see FIG. 4) on the circuit board 32, thereby holding the circuit board 32. As a result, the circuit board 32 is mechanically connected to the drive motor 22. On the circuit board 32, there is a plurality of surface-mount (SMT) elements 50 such as resistors, ICs and capacitors which are electrically connected.

The circuit board 32 contains two portions (not shown), among which a first portion is accommodated within the main portion 20 and aligned with an end face of the drive motor 22. A second portion (also not shown) of the circuit board 32 extends in the handle portion 28. A switch 38 is mechanically connected to the second portion. The circuit board 32 is directly connected to the drive motor 22 and the switch 38 without any electric wires, which will be described in more details later. The switch 38 is further connected to the trigger 26 mechanically via a connecting rod 37, so that when the user presses the trigger 26 the switch 38 will be actuated.

Figure 4:
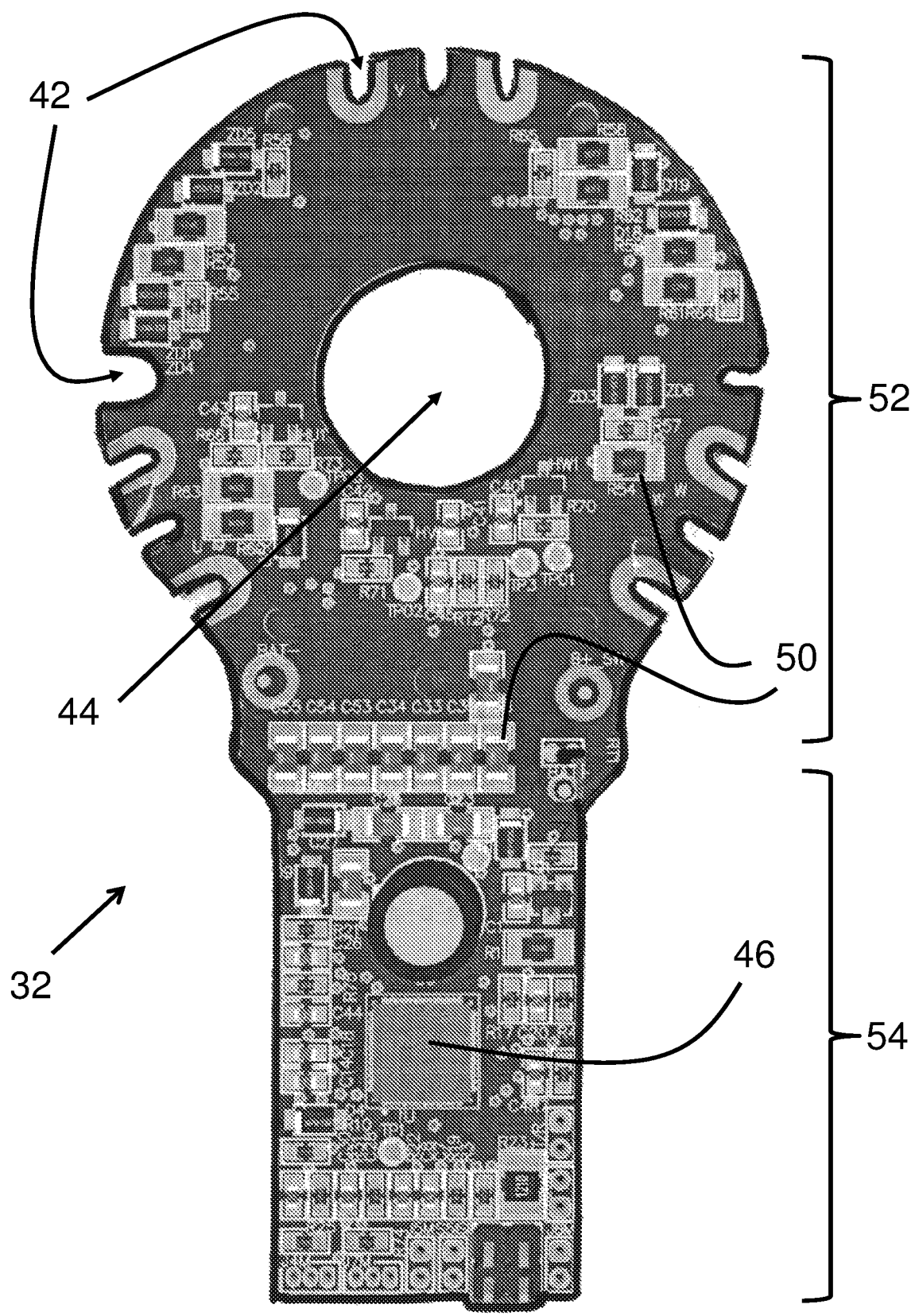
FIG. 4 shows the front view of the circuit board in the power tool in FIG. 1.

Turning to FIG. 4, the shape of the circuit board 32 is not a standard geometrical shape. Rather, the first portion 52 of the circuit board 32 is in a circular shape, and the second portion 54 of the circuit board 32 is in a rectangular shape. On the first portion 52, there is a through hole 44 formed at the center thereof which allows the drive shaft (not shown) of the drive motor to pass through when the circuit board 32 is installed as in the status of FIGS. 2-3. On the peripheral rim of the first portion 52, there are a plurality of vias 42 which are either used for mechanically supporting the circuit board 32 on the casing and the drive motor as described above, or provide electrical connections by receiving electrically conducting pins from the drive motor so that circuit board 32 is electrically connected to the drive motor.

Figure 21:
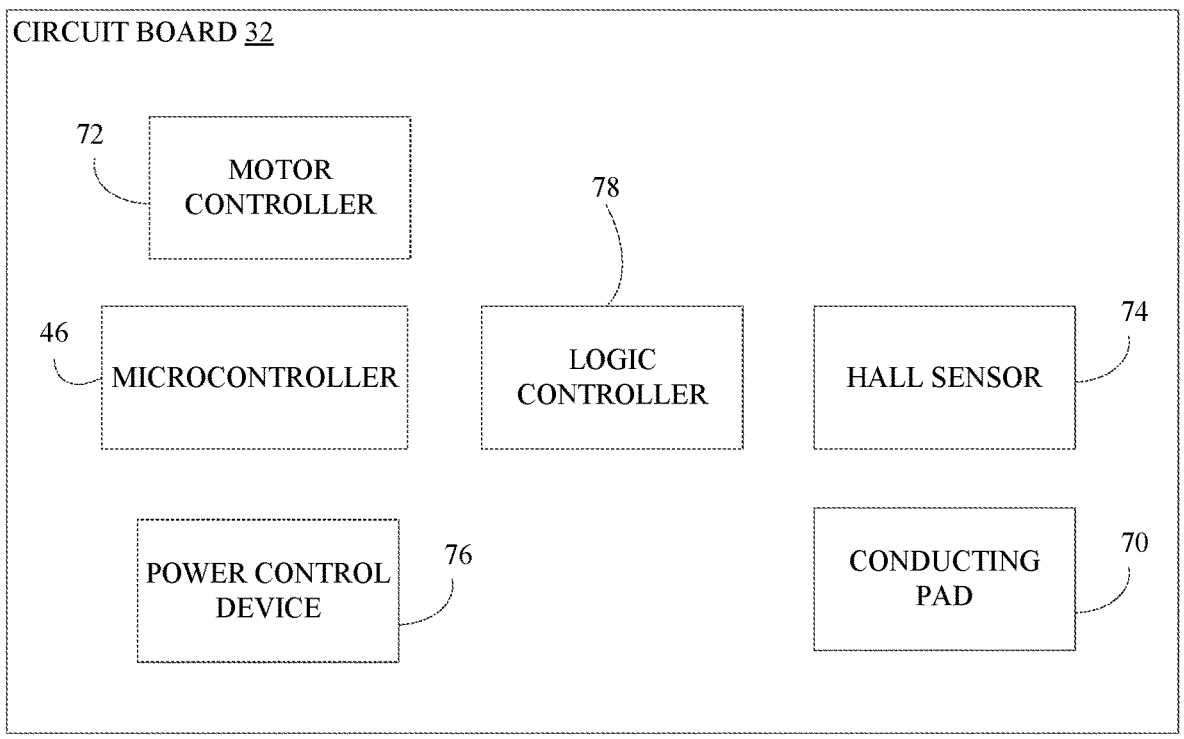
FIG. 21 shows a block diagram of the circuit board of FIG. 4 according to an example embodiment.

On the second portion 54, there are more SMT elements 50 compared to the first portion 52. There is also a conducting pad 70 (see FIG. 21) on the second portion 54 which is in direct contact with the switch described above, where the switch is electrically connected with the conducting pad.

The circuit board 32 described is a single, integrated circuit board of the power tool in the above embodiment. In particular, there is no other circuit board existed in the power tool, and the circuit board 32 carries electrical circuits responsible for operating all functions of the power tool. The circuit board 32 carries a motor controller 72 for the BLDC motor (see FIG. 21), as well as other circuit elements for controlling the power tool, in particular a microcontroller 46 mounted on the second portion 54 of the circuit board 32. The microcontroller 46 manages centrally all the control logic and electrical operations of the power tool. The circuit board 32 is the only circuit board present in the power tool and there is no other circuit board, either primary or auxiliary. Preferably, a Hall sensor 74, a power control device 76 for controlling activation of the power tool, and a logic controller 78 are integrated into the circuit board 32 (see FIG. 21). In addition, a heat sink may be implemented on the circuit board 32 to provide adequate heat dissipation for the circuit board 32.

Now turning to the operation of the power tool described above, by referring to FIG. 2 the operation of the power tool is activated by the user pressing on the trigger 26. The trigger 26 is mechanically connected to the switch 38 via the connecting rod 37 and thus the switch 38 is actuated by the user pressing on the trigger 26. As the switch 38 is in direct contact with the circuit board 32, the input command given by the user is converted to a motor control signal which is then sent to the drive motor 22 to actuate the drive motor 22. When the user releases the trigger 26, the switch 38 becomes deactivated and this is processed as an input command for the drive motor 22 to stop operation.

Figure 5:
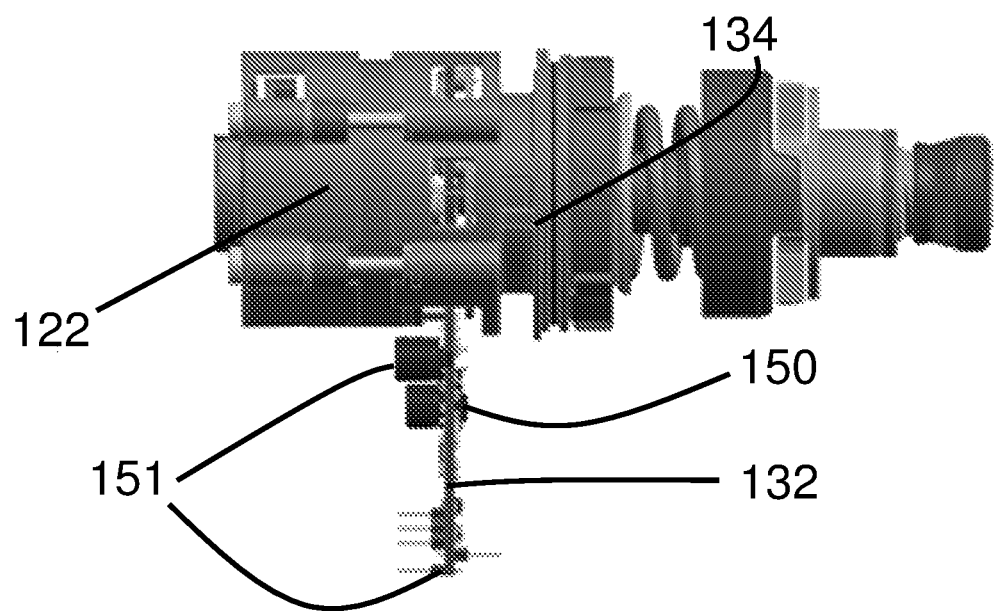
FIG. 5 shows the structure of an impact wrench including its motor assembly and the circuit board according to another embodiment of the present invention.

FIG. 5 shows the structure of the power tool and its circuit board according to another embodiment of the present invention. The power tool shown is an impact wrench. The circuit board 132 is also mounted between the drive motor 122 and the gear mechanism in 134, similar to the embodiment shown in FIGS. 2-4. On the circuit board 132 there are not only SMT elements 150 but also non-SMT elements 151 such as electrolytic capacitor in SIP/DIP packaging, and pin socket for receiving external plugs.

Figure 6:
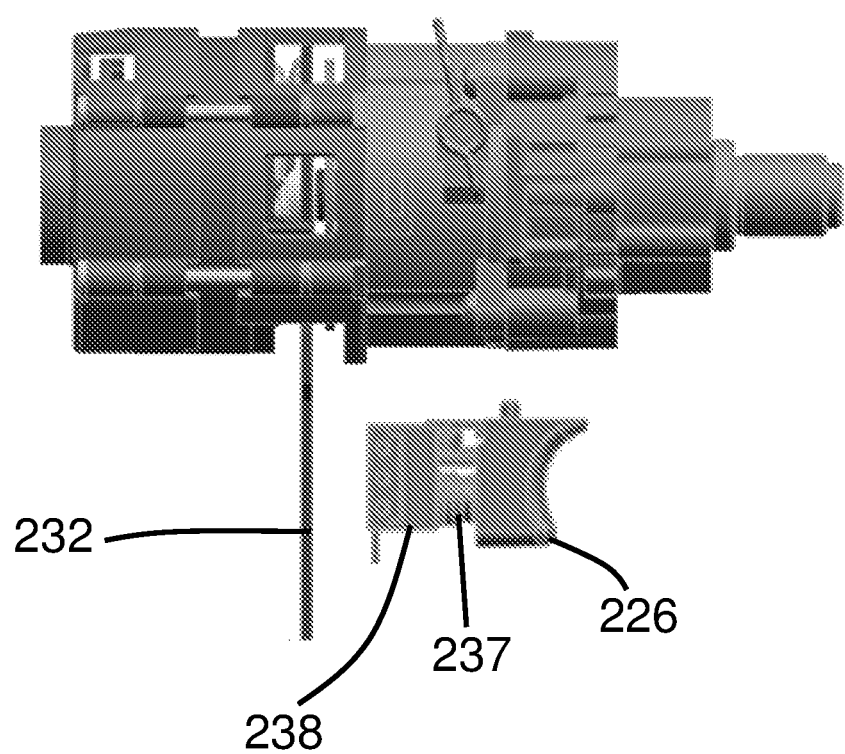
FIG. 6 shows the structure of a drill/screwdriver including its motor assembly and the circuit board according to another embodiment of the present invention.

FIG. 6 shows the structure of the power tool and its circuit board according to a third embodiment of the present invention. Structures and connections similar to those described with reference to FIGS. 2-4 will be omitted here for the sake of brevity. However, what is different in this embodiment compared to FIG. 6 is that the switch 238 and trigger 226 used here are in the form of an integrated package. The switch 238 is connected to the trigger 226 mechanically via a connecting rod 237, so that when the user presses the trigger 226 the switch 238 will be actuated. A compression spring is also configured outside the connecting rod 237 to provide a biasing force to the trigger 226 to move it to the inactivated position when the user's finger does not press the trigger 226 down.

Figure 7:
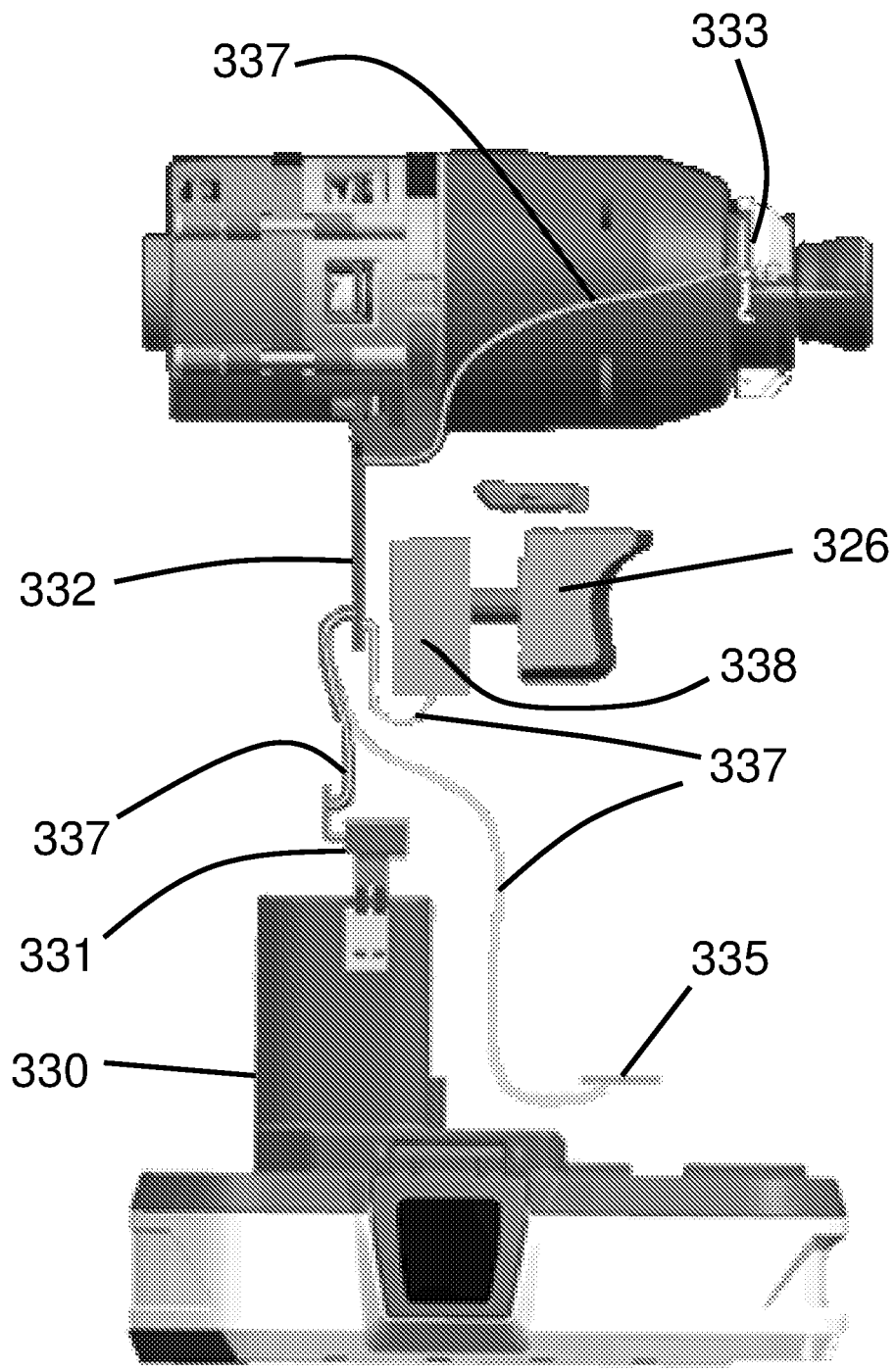
FIG. 7 shows the structure of a drill/screwdriver including a trigger assembly as well sub-functional circuit boards that are connected to the main circuit board by wires, according to another embodiment of the present invention.

Turning now to FIG. 7, in a fourth embodiment of the present invention a power tool is shown to have a circuit board 332 connected to various other components, and in particular sub-functional circuit boards 333, 335 by electric wires. In particular, the switch 338 is connected to the circuit board 332 by electric wires 337, instead of directly mounting the switch 338 on the circuit board 332 like that in FIGS. 2-4. Also, the circuit board 332 is connected to a battery terminal 331 of the power tool by electric wires 337, where the battery terminal 331 is able to be made into contact with the corresponding terminals of an external power tool battery 330. A sub-functional circuit board 333 is configured at the front end of the power tool casing (not shown) to provide work light during operation of the power tool. Another sub-functional circuit board 335 is provided near the bottom end of the handle portion (not shown) to provide electronic speed control functions, and a further work light for illumination. Both sub-functional circuit boards 333, 335 are connected to the circuit board 332 by electric wires 337.

Figure 8A:
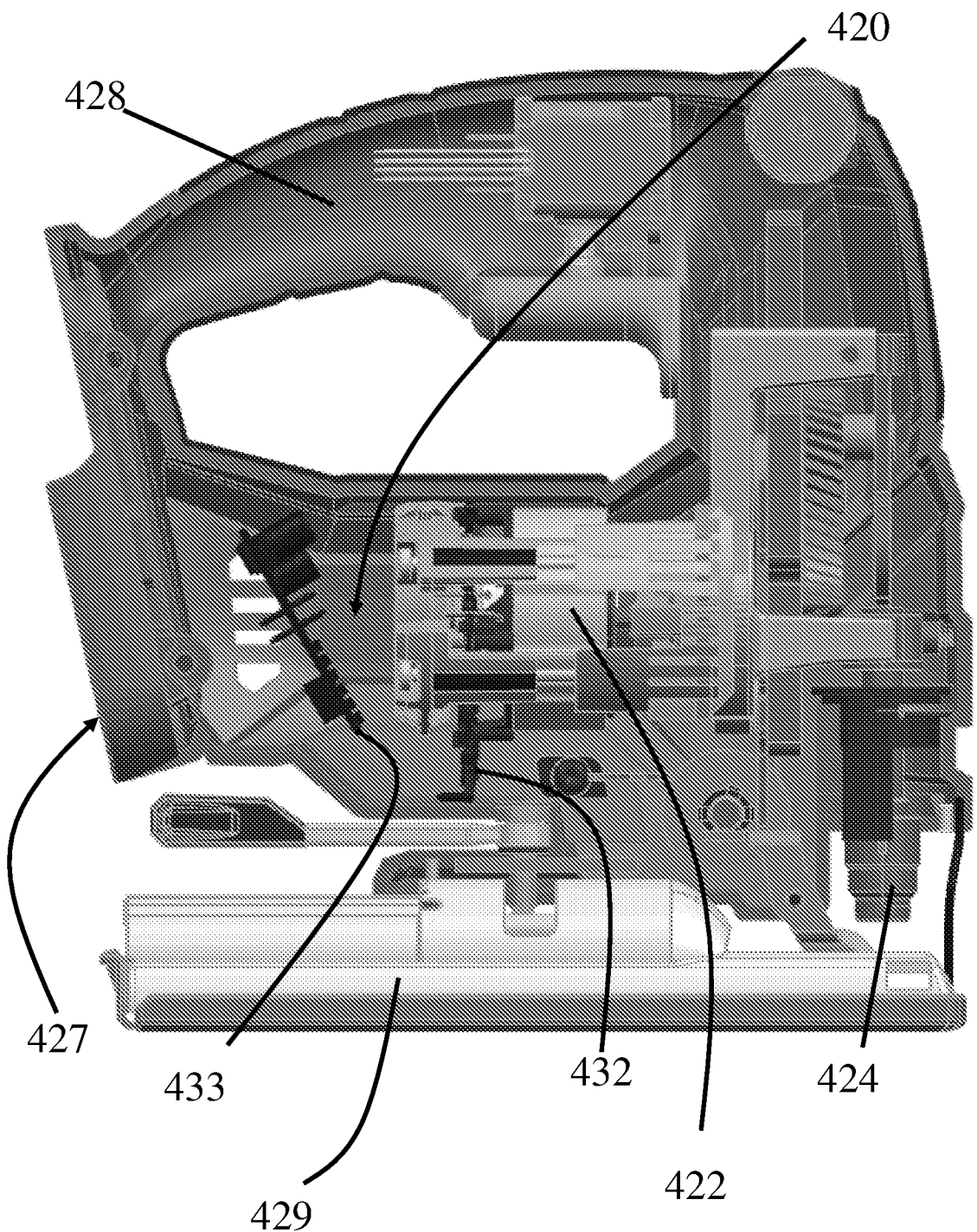
FIG. 8a is a side view showing the internal structure of a jig saw according to another embodiment of the present invention.
Figure 8B:
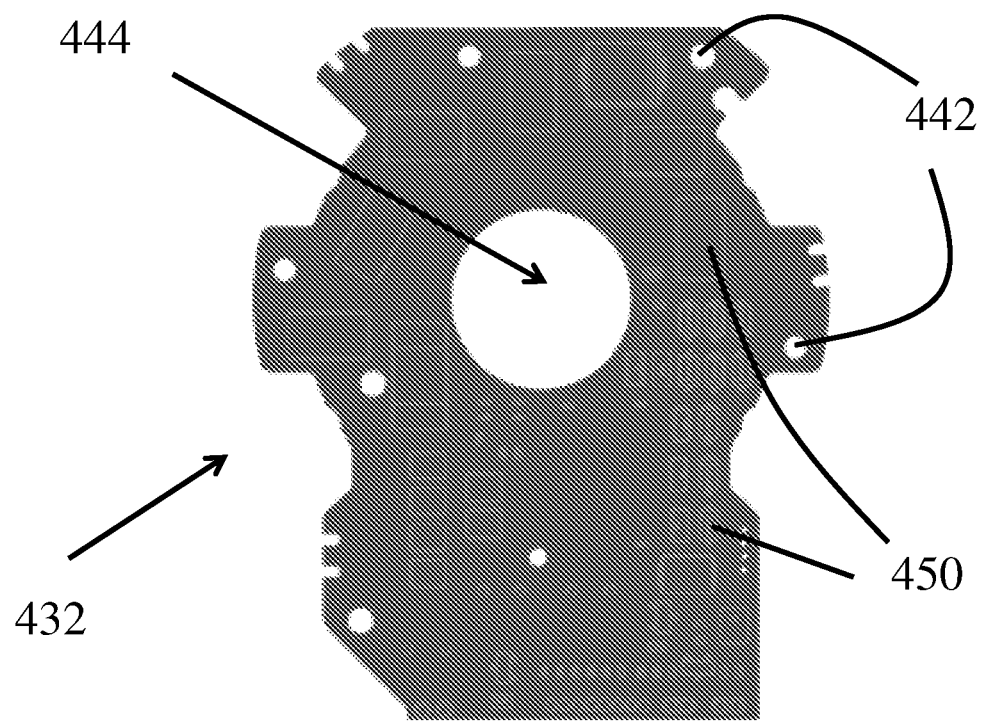
Figure 8C:
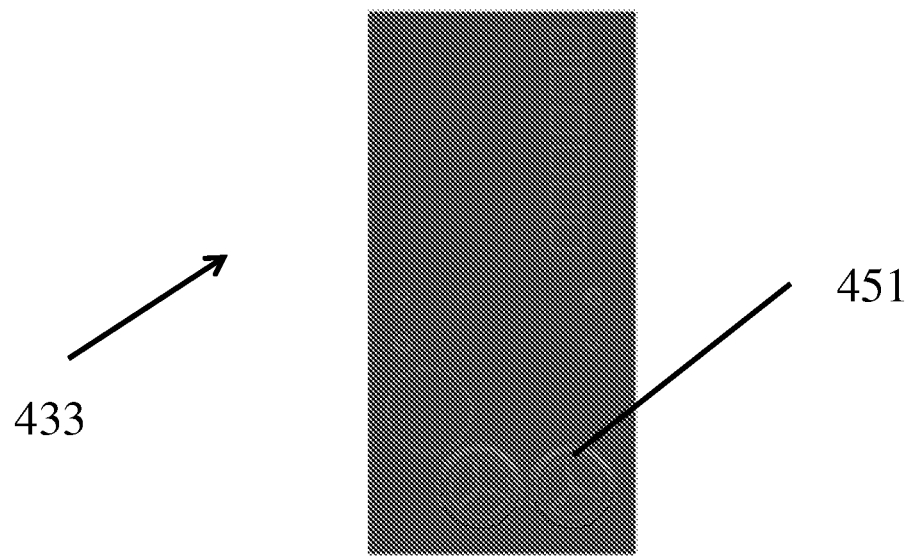

FIGS. 8*a*-8*c* show a fifth embodiment of the present invention which is a battery-powered jig saw. The jig saw as shown in FIG. 8*a* includes a handle portion 428, a main portion 420 connected to the handle portion 428, and a shoe or base 429. On a side of the main portion 420 adjacent to the shoe 429, there is a blade holder 424 driven by a motor 422. The motor 422 is arranged perpendicular to the axial direction of the blade holder 424, and at one end of the motor there is connected a first circuit board 432 which extends perpendicular to the motor shaft direction. The first circuit board 432 similar to those mentioned in previous embodiments is a single, integrated circuit board which carries a motor controller for the BLDC motor 422, as well as other circuit elements for controlling the jig saw. In addition, a second circuit board 433 is installed inside the main portion 420 and next to the battery receptacle 427. The second circuit board 433 is used to couple to an external battery pack (not shown) which connects at the battery receptacle 427 and carries out functions such as taking power supply from the battery pack and performing data communication with the battery pack circuit. The second circuit board 433 also acts as an interface board for user actuated switches such as the trigger (not shown). FIG. 8*b* shows the front view of the first circuit board 432 which has an irregular shape and is formed with a through hole 444 at the center thereof which allows the drive shaft (not shown) of the drive motor 422 to pass through. On the peripheral rim of the first circuit board 432, there is a plurality of vias 442. The circuit components carried on the first circuit board 432 are SMT components 450. On the other hand, the second circuit board 433 as shown in FIG. 8c has a rectangular shape, and contains various non-SMT components 451. The electric circuit in the jig saw operates in a well-known manner so the operation of the circuit will not be described in details here.

Figure 9A:
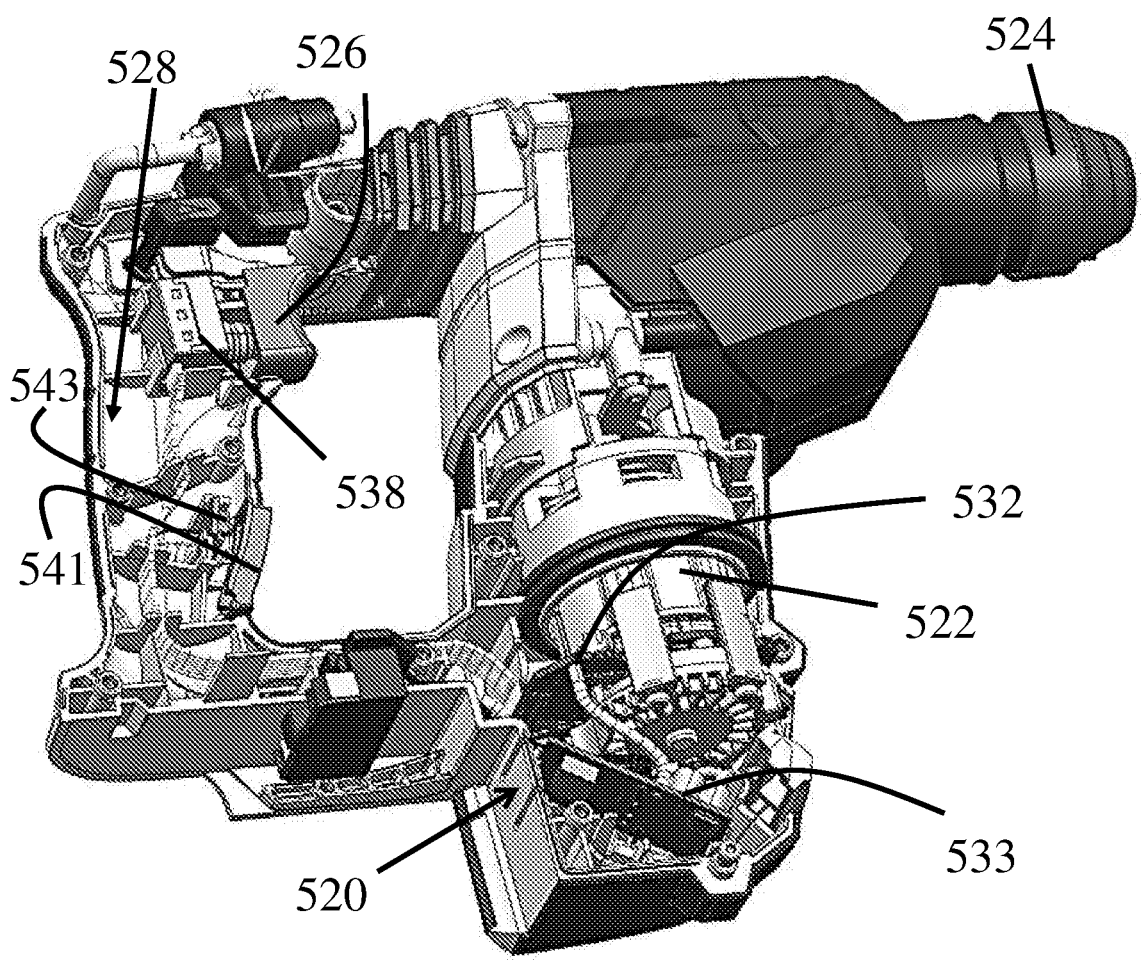
FIG. 9a shows a partially exposed view of the internal structure of a rotary hammer drill according to another embodiment of the present invention.

FIGS. 9a-9d show a sixth embodiment of the present invention which is a battery-powered brushless rotary hammer drill. The drill as shown in FIG. 9a includes a handle portion 528, and a main portion 520 connected to the handle portion 528. On a side of the main portion 520 opposite to the handle portion 528, there is a blade holder 524 driven by a motor 522. The motor 522 is arranged perpendicular to the axial direction of the blade holder 524, and at one end of the motor there is connected a first circuit board 532 which extends perpendicular to the motor shaft direction. The first circuit board 532 similar to those mentioned in previous embodiments is a single, integrated circuit board which carries a motor controller for the BLDC motor 522, as well as other circuit elements for controlling the drill. In addition, a second circuit board 533 is installed inside the main portion 520 and arranged relative to the second circuit board 532 at an angle. The second circuit board 533 is used to couple to an external battery pack (not shown) and carries out functions such as taking power supply from the battery pack and performing data communication with the battery pack circuit. On the handle portion 528, there are configured a first trigger 526 and a second trigger 541, which are connected to and adapted to drive a first switch 538 and a second switch 543 respectively.

Figure 9B:
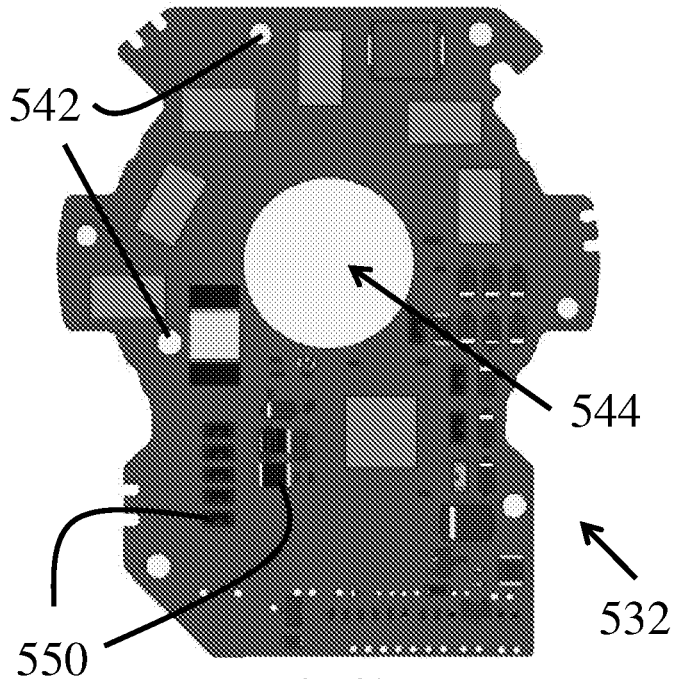
Figure 9C:
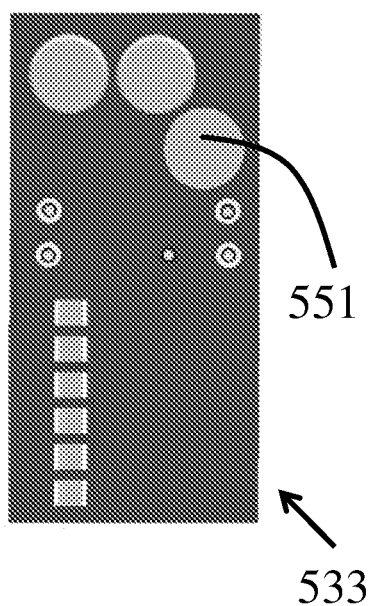
Figure 9D:
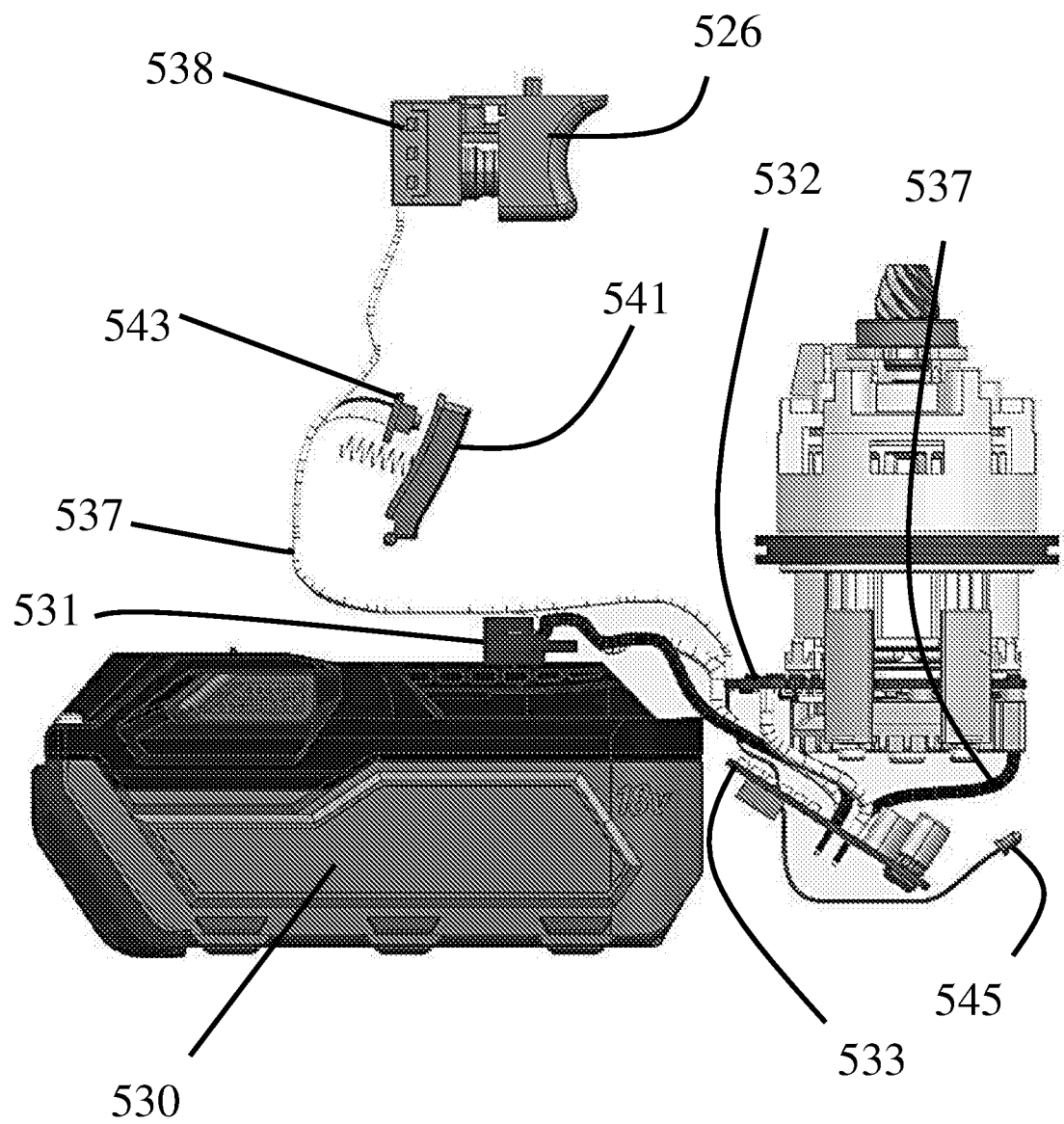

FIG. 9b shows the front view of the first circuit board 532 which has an irregular shape and is formed with a through hole 544 at the center thereof which allows the drive shaft (not shown) of the drive motor 522 to pass through. On the peripheral rim of the first circuit board 532, there is a plurality of vias 542. The circuit components carried on the first circuit board 532 are SMT components 550. On the other hand, the second circuit board 533 as shown in FIG. 9c has a rectangular shape, and contains various non-SMT components 551. FIG. 9d shows the circuit connections between the major components of the hammer drill. In particular, the first switch 538 and the second switch 543 are both electrically connected to the second circuit board 533 by electric wires 537. The spring-biased first trigger 526 and second trigger 541 are connected to the first switch 538 and the second switch 543 respectively. The second circuit board 533 further connects to the first circuit board 532, a work light 545, and a battery receptacle 531 respectively via electric wires 537. The battery receptacle 531 is used to couple to respective terminals on an external battery pack 530. The electric circuit in the drill operates in a well-known manner so the operation of the circuit will not be described in details here.

Figure 10A:
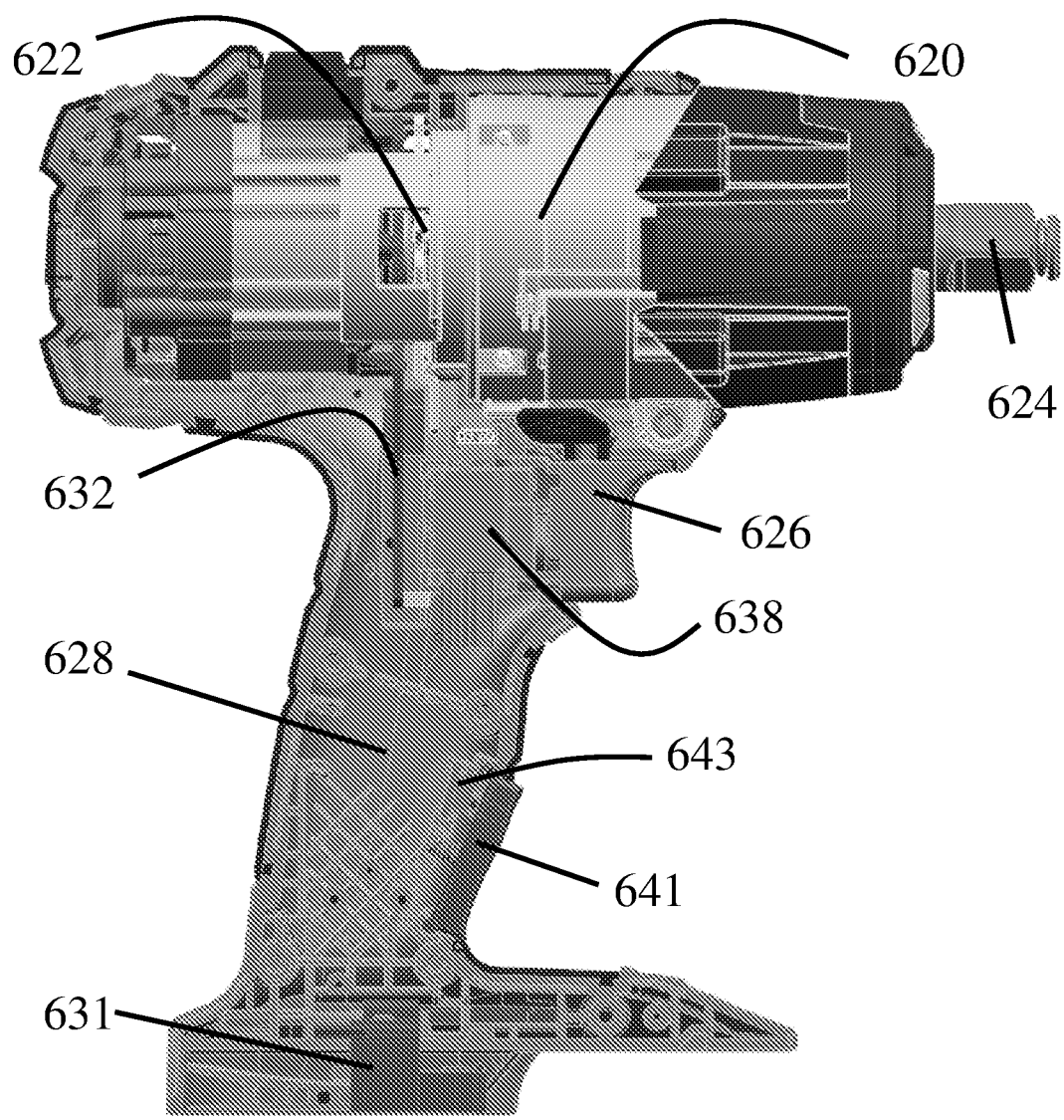
FIG. 10a shows the internal structure of an impact wrench according to another embodiment of the present invention.
Figure 10B:
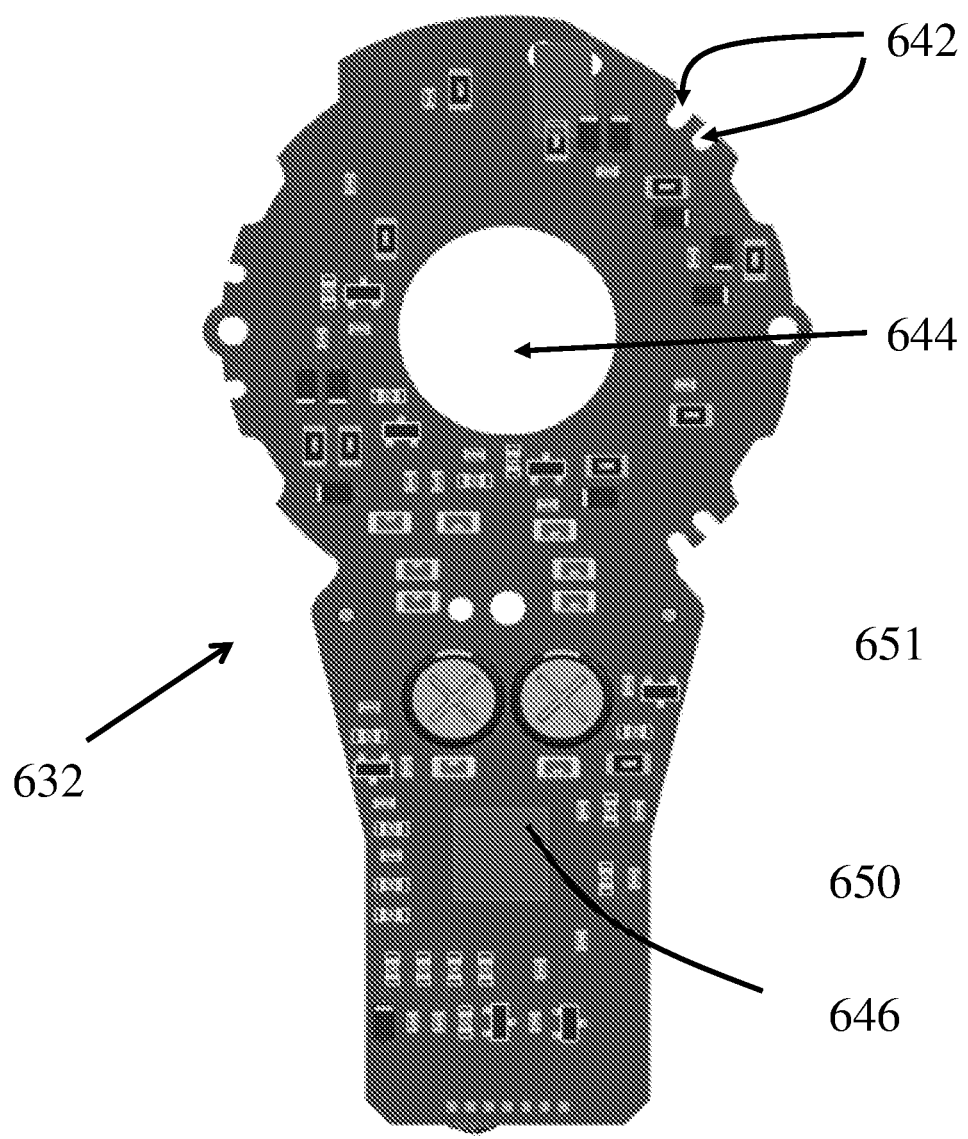
Figure 10C:
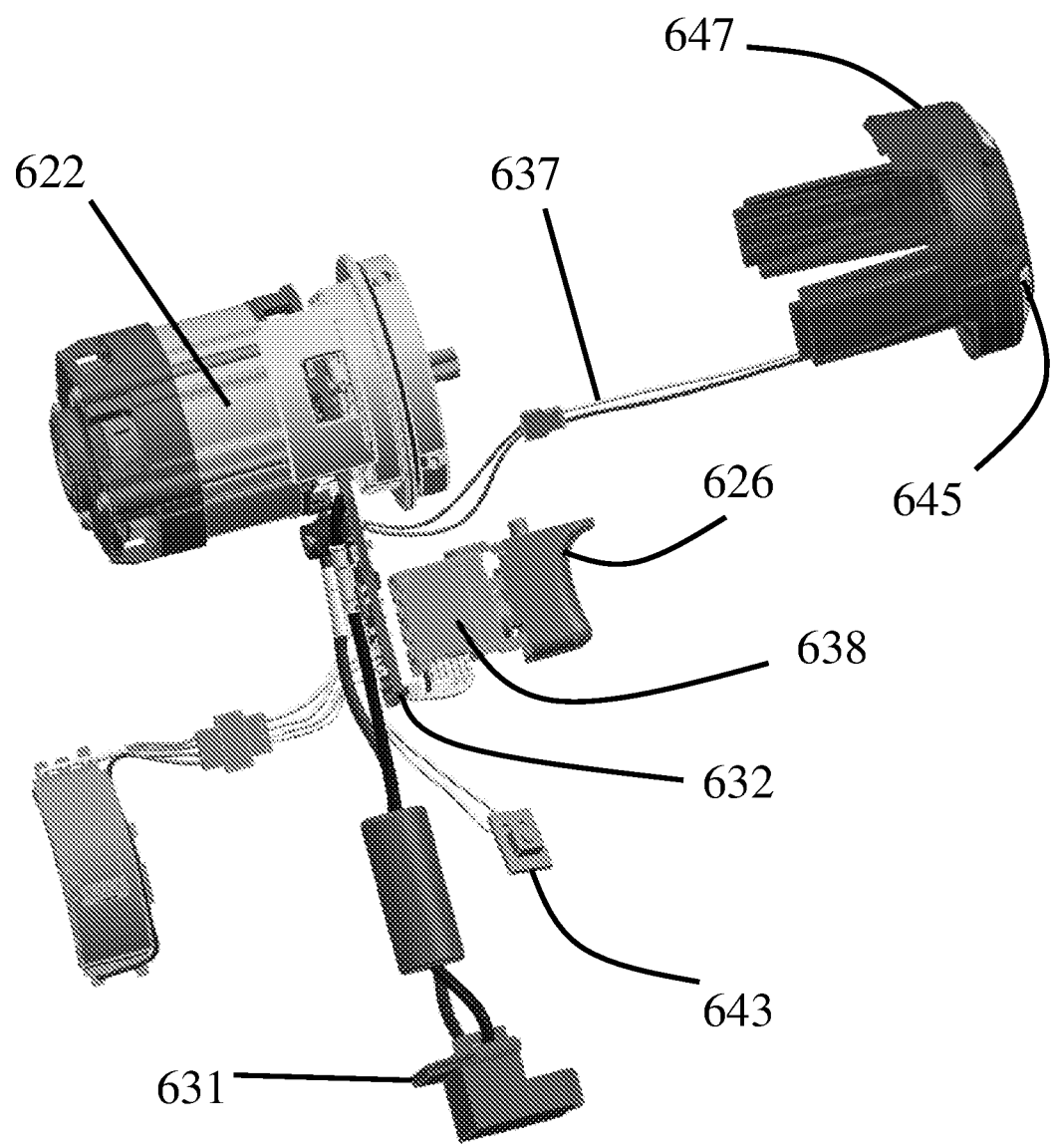

FIGS. 10a-10c show a sixth embodiment of the present invention which is an impact wrench. The impact wrench as shown in FIG. 10a includes a handle portion 628, and a main portion 620 connected to the handle portion 628. On a front end of the main portion 620 there is a tool bit holder 624 driven by a motor 622. The motor 622 is arranged to be substantially perpendicular to the longitudinal direction of the handle portion 628. At one end of the motor there is connected a circuit board 632 which extends perpendicular to the motor shaft direction. The circuit board 632 similar to those mentioned in previous embodiments is a single, integrated circuit board which carries a motor controller for the BLDC motor 622, as well as other circuit elements for controlling the impact wrench. On the handle portion 628, there are configured a first trigger 626 and a second trigger 641, which are connected to and adapted to drive a first switch 638 and a second switch 643 respectively. The first switch 638 and the second switch 643 are connected to the circuit board 632 electrically. A battery receptacle 631 is also connected to the circuit board 632 electrically.

FIG. 10b shows the front view of the circuit board 632 which has an irregular shape consisted of a round part and a substantially rectangular part, similar to those shown in FIG. 4. There is formed a through hole 644 at the center of the circuit board 832 which allows the drive shaft (not shown) of the drive motor 622 to pass through. On the peripheral rim of the circuit board 632, there is a plurality of vias 642. The circuit components carried on the circuit board 632 include both SMT components 650, non-SMT components 651, as well as a microcontroller 646. FIG. 10c shows the circuit connection between the major components. In particular, the first switch 638 and the second switch 643 are both electrically connected to the circuit board 632 by electric wires 637. The spring-biased first trigger 626 and second trigger 641 are connected to the first switch 638 and the second switch 643 respectively. The circuit board 632 further connects to several work lights 645 located at the head portion 647 of the tool, and a battery receptacle 631 respectively via electric wires 637. The battery receptacle 631 is used to couple to respective terminals on an external battery pack (not shown). The electric circuit in the impact wrench operates in a well-known manner so the operation of the circuit will not be described in details here.

Figure 11A:
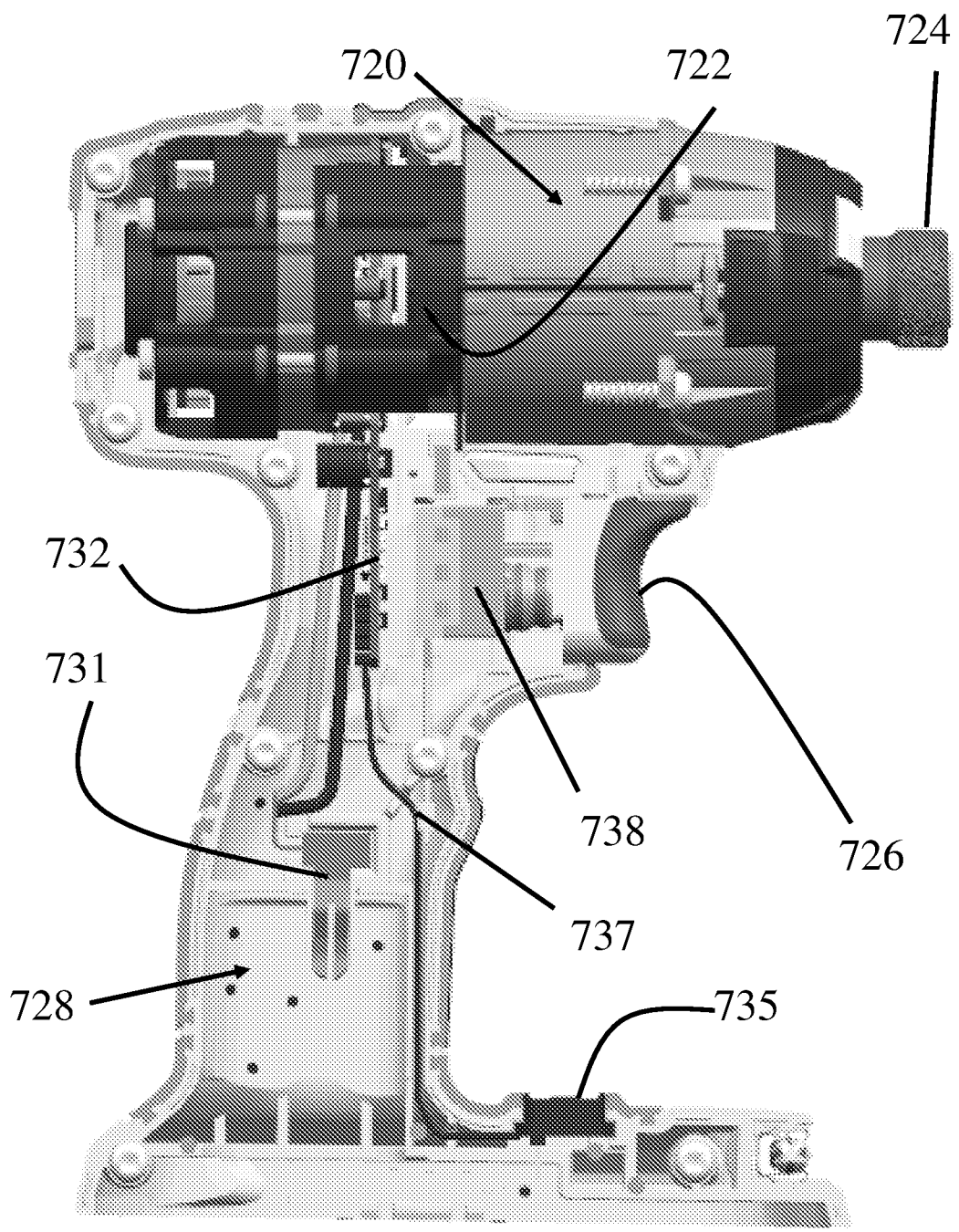
FIG. 11a shows the internal structure of a rotary hammer drill according to another embodiment of the present invention.
Figure 11B:
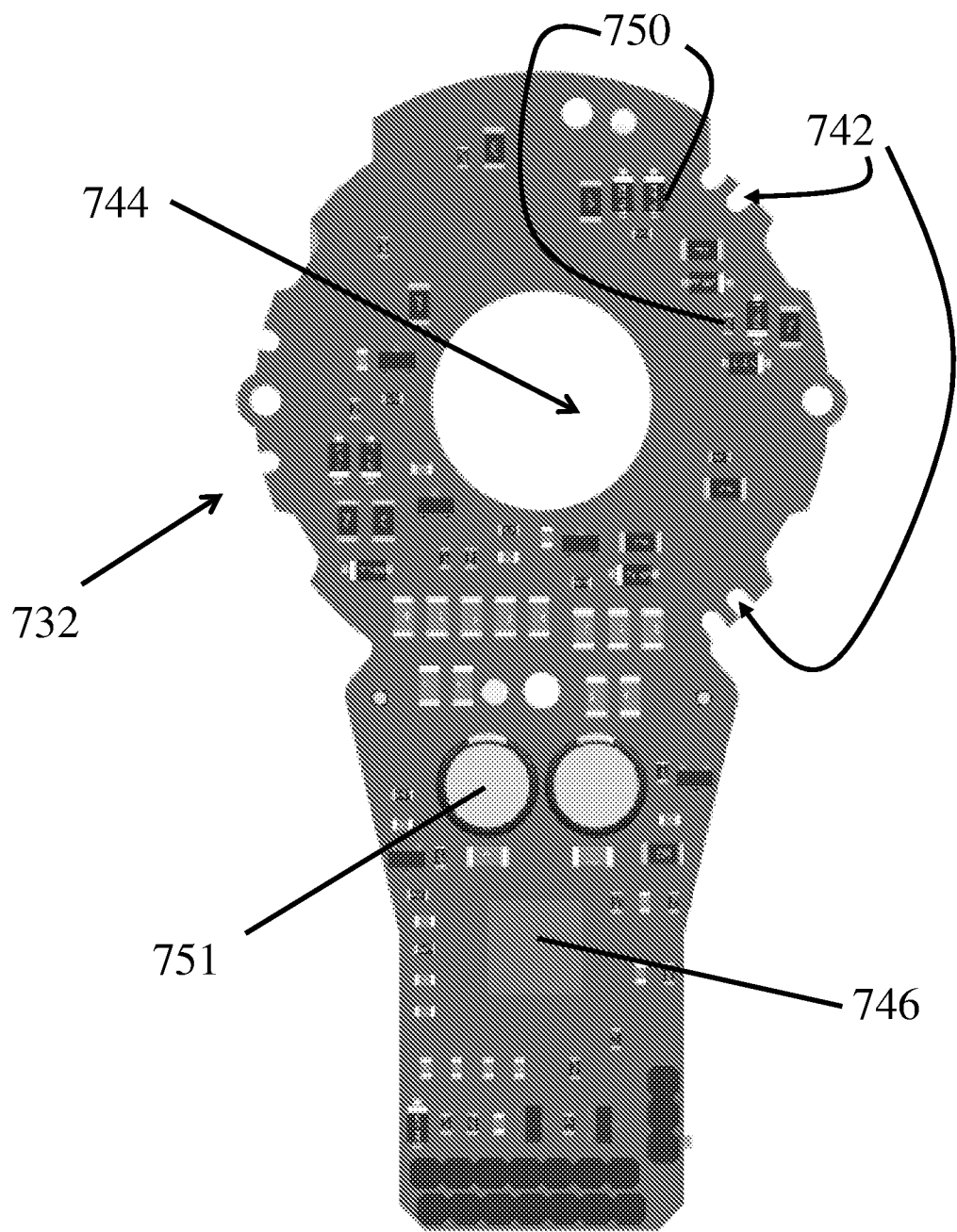
Figure 11C:
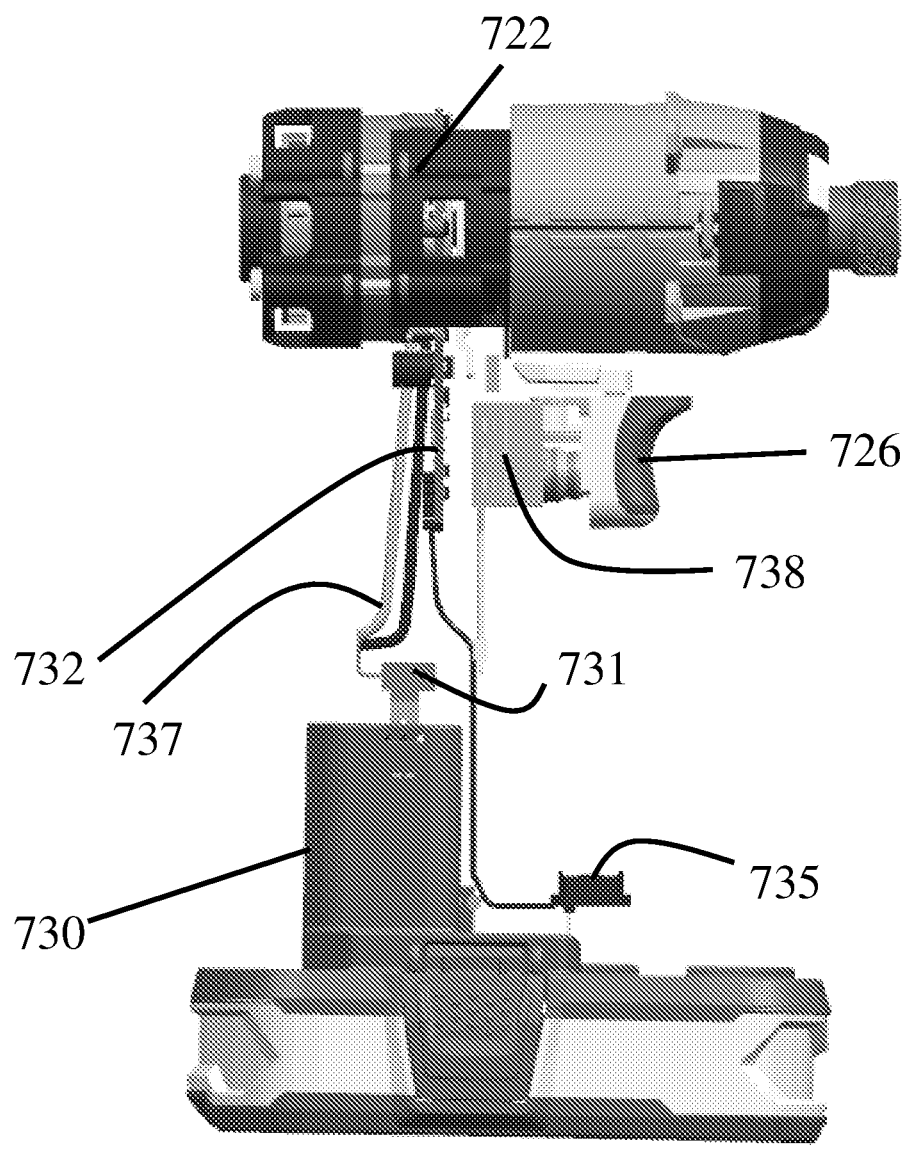

FIGS. 11a-11c show a seventh embodiment of the present invention which is a battery-powered brushless rotary hammer drill. The drill as shown in FIG. 11a includes a handle portion 728, and a main portion 720 connected to the handle portion 728. On a front end of the main portion 720 there is a tool bit holder 724 driven by a motor 722. The motor 722 is arranged substantially perpendicular to the longitudinal direction of the handle portion 728. At one end of the motor there is connected a circuit board 732 which extends perpendicular to the motor shaft direction. The circuit board 732 similar to those mentioned in previous embodiments is a single, integrated circuit board which carries a motor controller for the BLDC motor 722, as well as other circuit elements for controlling the hammer drill. On the handle portion 728, there is configured a trigger 726 which is connected to and adapted to drive a switch 738. The switch 738 is connected to the circuit board 732 electrically. A battery receptacle 731 is also connected to the circuit board 732 electrically. Another sub-functional circuit board 735 is provided near the bottom end of the handle portion 728 to provide electronic speed control functions, and a further work light for illumination.

FIG. 11b shows the front view of the circuit board 732 which has an irregular shape consisted of a round part and a substantially rectangular part, similar to those shown in FIG. 4. There is formed a through hole 744 at the center of the circuit board 732 which allows the drive shaft (not shown) of the drive motor 722 to pass through. On the peripheral rim of the circuit board 732, there is a plurality of vias 742. The circuit components carried on the circuit board 732 include both SMT components 750, non-SMT components 751, as well as a microcontroller 746. FIG. 11c shows the circuit connection between the major components. In particular, the switch 738 is electrically connected to the circuit board 732 by electric wires 737. The spring-biased trigger 726 is connected to the switch 738. The battery receptacle 731 which is connected to the circuit board 732 also by electric wires 737 is used to couple to respective terminals on an external battery pack 730. The electric circuit in the hammer drill operates in a well-known manner so the operation of the circuit will not be described in details here.

Figure 12A:
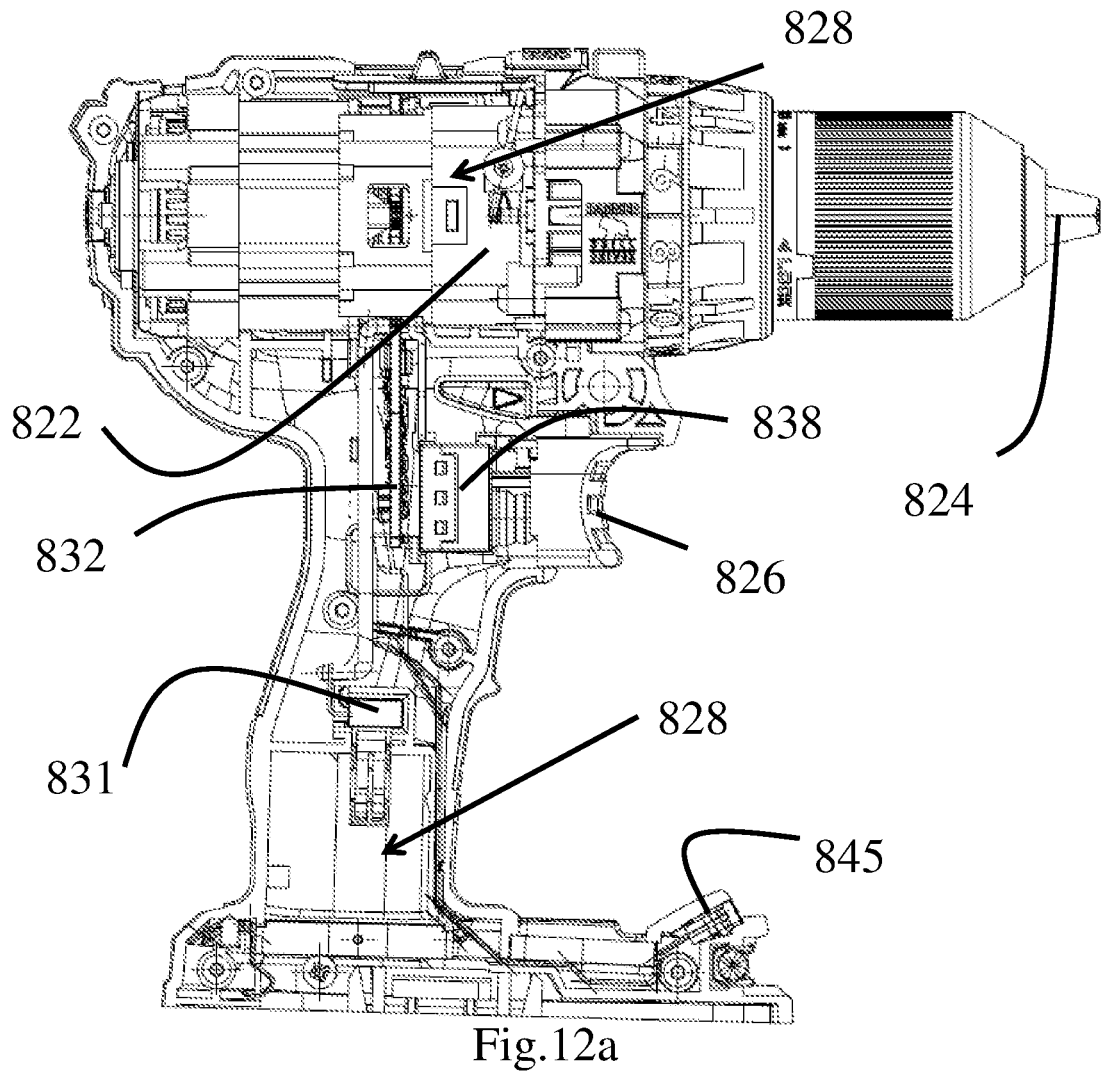
FIG. 12a shows the internal structure of a rotary hammer drill according to another embodiment of the present invention.
Figure 12B:
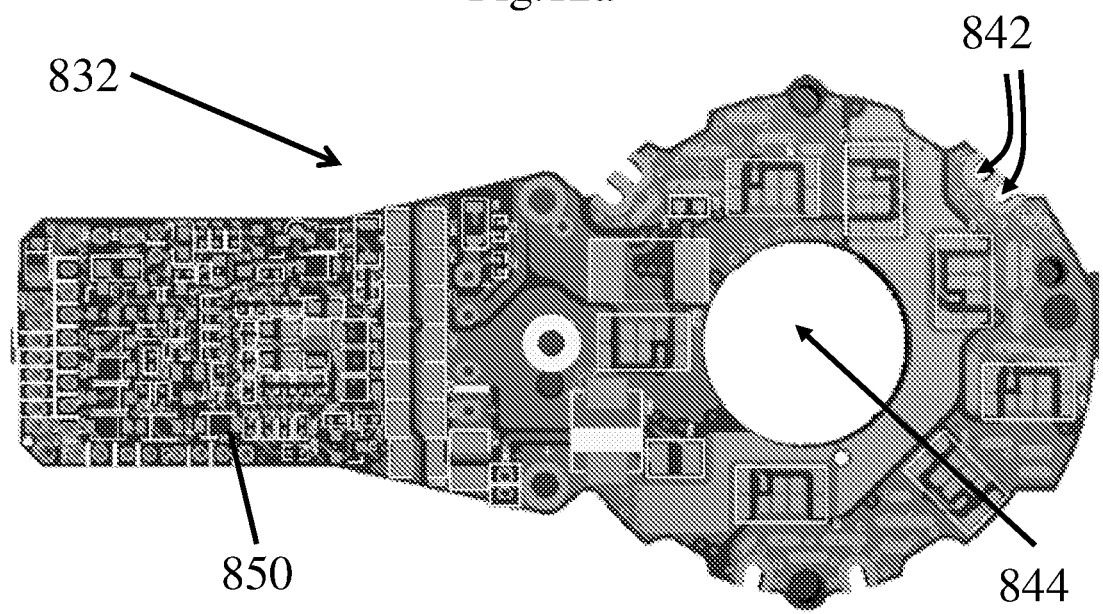
Figure 12C:
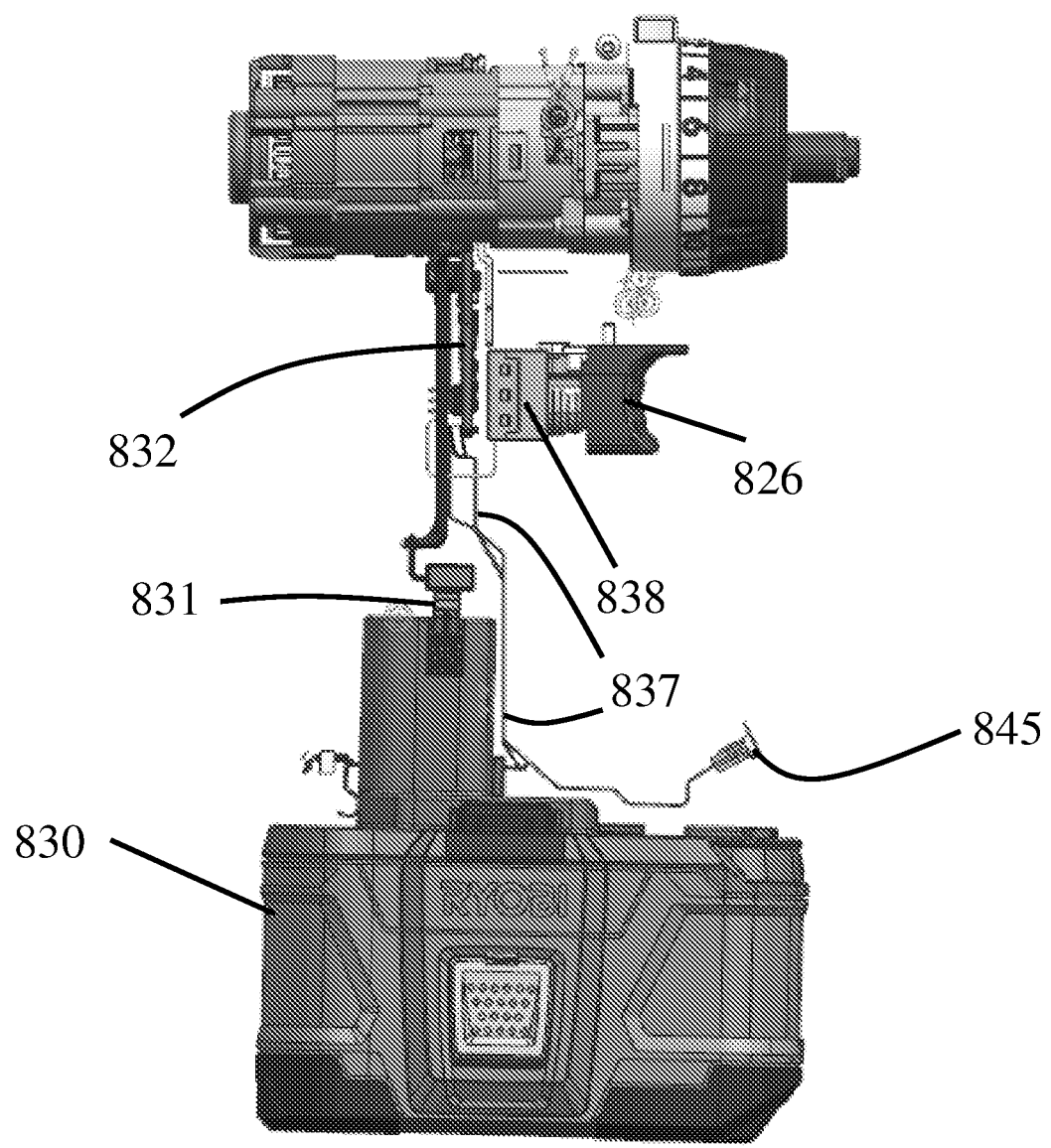

FIGS. 12a-12c show an eighth embodiment of the present invention which is a battery-powered brushless rotary hammer drill. The drill as shown in FIG. 12a includes a handle portion 828, and a main portion 820 connected to the handle portion 828. On a front end of the main portion 820 there is a tool bit holder 824 driven by a motor 822. The motor 822 is arranged substantially perpendicular to the longitudinal direction of the handle portion 828. At one end of the motor there is connected a circuit board 832 which extends perpendicular to the motor shaft direction. The circuit board 832 similar to those mentioned in previous embodiments is a single, integrated circuit board which carries a motor controller for the BLDC motor 822, as well as other circuit elements for controlling the hammer drill. On the handle portion 828, there is configured a trigger 826 which is connected to and adapted to drive a switch 838. The switch 838 is connected to the circuit board 832 electrically. A battery receptacle 831 is also connected to the circuit board 832 electrically. Another sub-functional circuit board 835 is provided near the bottom end of the handle portion 828 to provide electronic speed control functions, and a further work light for illumination.

FIG. 12b shows the front view of the circuit board 832 which has an irregular shape consisted of a round part and a substantially rectangular part, similar to those shown in FIG. 4. There is formed a through hole 844 at the center of the circuit board 832 which allows the drive shaft (not shown) of the drive motor 822 to pass through. On the peripheral rim of the circuit board 832, there is a plurality of vias 842. The circuit components carried on the circuit board 832 include SMT components 850. FIG. 12c shows the circuit connection between the major components. In particular, the switch 838 is electrically connected to the circuit board 832 by electric wires 837. The spring-biased trigger 826 is connected to the switch 838. The battery receptacle 831 is used to couple to respective terminals on an external battery pack 830. The work light 845 is also connected to the circuit board 832 via electric wires 837. The electric circuit in the hammer drill operates in a well-known manner so the operation of the circuit will not be described in details here.

Figure 13D:
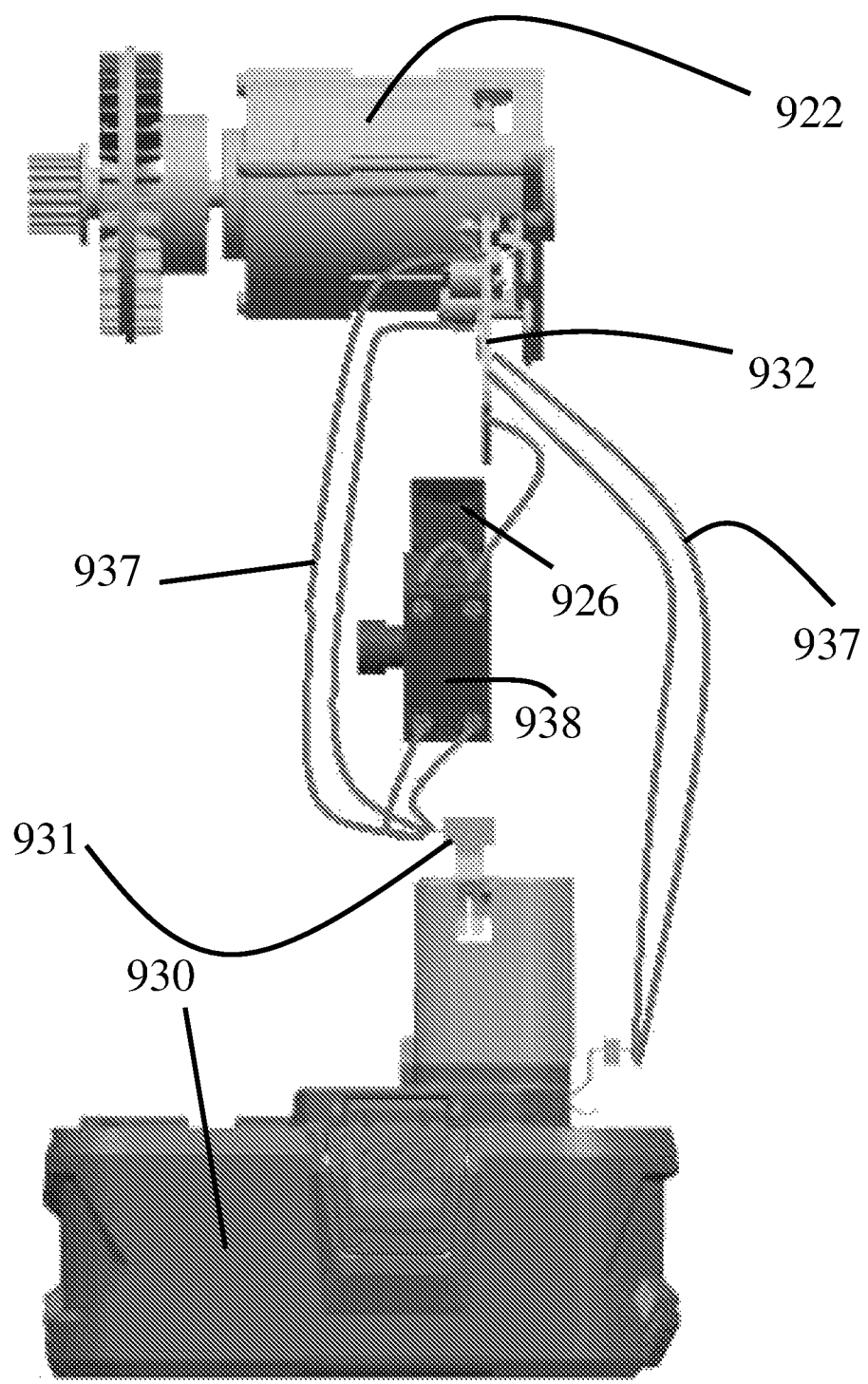

FIGS. 13a-13c show a ninth embodiment of the present invention which is a battery-powered belt sander. A part of the belt sander as shown in FIG. 12a includes a handle portion 928, and a main portion 920 connected to the handle portion 928. A motor 922 is transversely installed in the main portion 920 with the motor shaft direction perpendicular to the longitudinal direction of the entire belt sander. At one end of the motor there is connected a circuit board 932 which extends perpendicular to the motor shaft direction (which is shown more clearly in FIG. 13d). FIGS. 13a and 13b show the two sides of the circuit board 932. The circuit board 932 similar to those mentioned in previous embodiments is a single, integrated circuit board which carries a motor controller for the BLDC motor 922, as well as other circuit elements for controlling the belt sander. The circuit board 932 which has an irregular shape consisted of a round part and a substantially rectangular part, similar to those shown in FIG. 4. There is formed a through hole 944 at the center of the circuit board 932 which allows the drive shaft (not shown) of the drive motor 922 to pass through. On the peripheral rim of the circuit board 932, there is a plurality of vias 942. The circuit components carried on the circuit board 932 include SMT components 950, non-SMT components 951, as well as a microcontroller 946.

FIG. 13d shows the circuit connection between the major components. In particular, a switch 938 and a battery receptacle 931 are electrically connected to the circuit board 932 by electric wires 937. A trigger 926 is connected to the switch 938. The battery receptacle 931 is used to couple to respective terminals on an external battery pack 930. The electric circuit in the belt sander operates in a well-known manner so the operation of the circuit will not be described in details here.

Figure 14A:
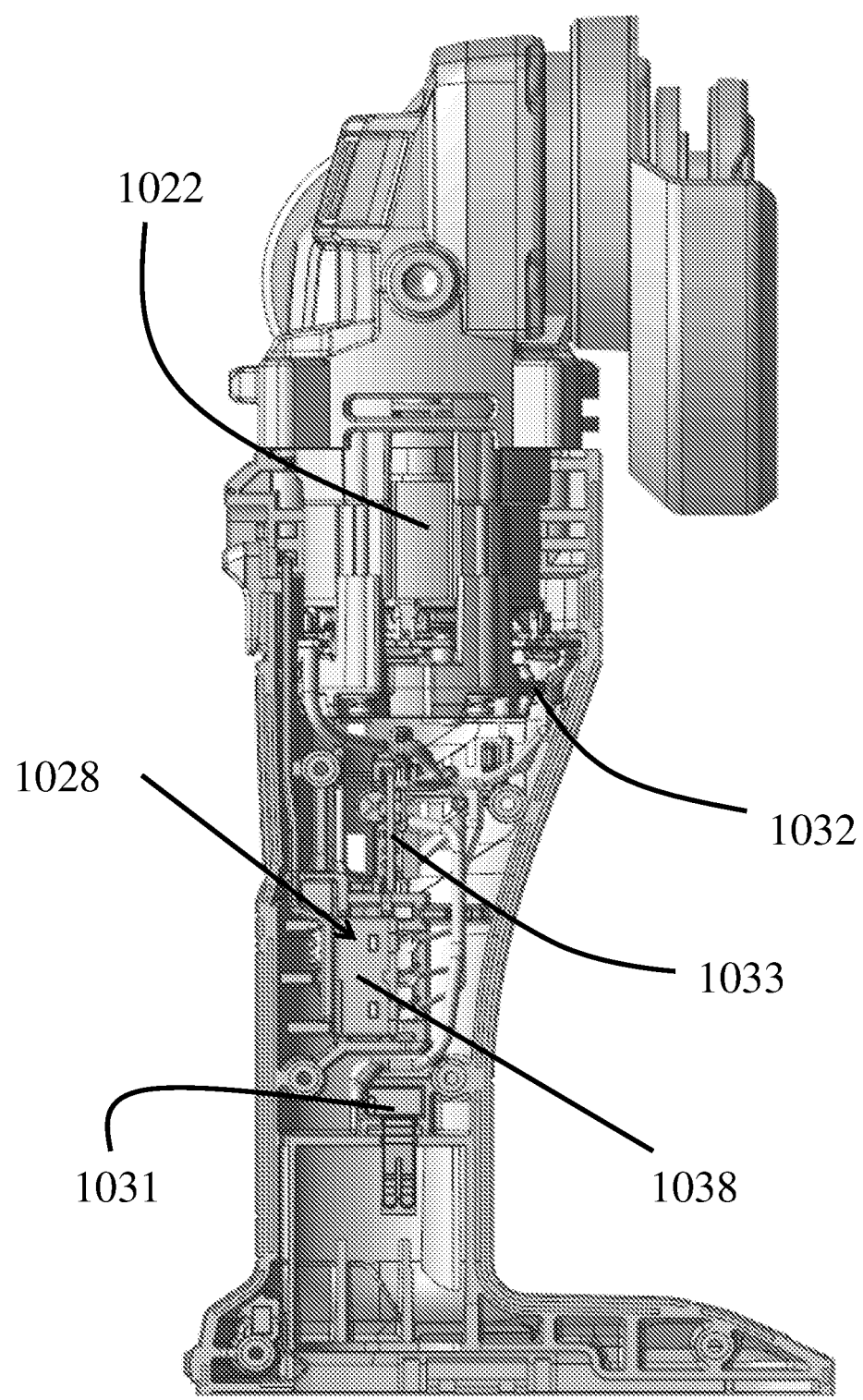
FIG. 14a shows a part of the internal structure of an angle grinder according to another embodiment of the present invention.

FIGS. 14a-14d show a tenth embodiment of the present invention which is a battery-powered angle grinder. A part of the angle grinder as shown in FIG. 14a includes a handle portion 1028 in which the motor 1022 and other major components are accommodated. The motor 1022 is oriented to be parallel to the longitudinal direction of the handle portion 1028. At one end of the motor there is connected a first circuit board 1032 which extends perpendicular to the motor shaft direction. In addition, a second circuit board 1033 is installed in the handle portion 1028 with a direction perpendicular to the first circuit board 1032. The second circuit board 1033 is used to couple to an external battery pack (not shown) and carries out functions such as taking power supply from the battery pack and performing data communication with the battery pack circuit. The second circuit board 1033 also acts as an interface board for a user actuated switch 1038.

Figure 14B:
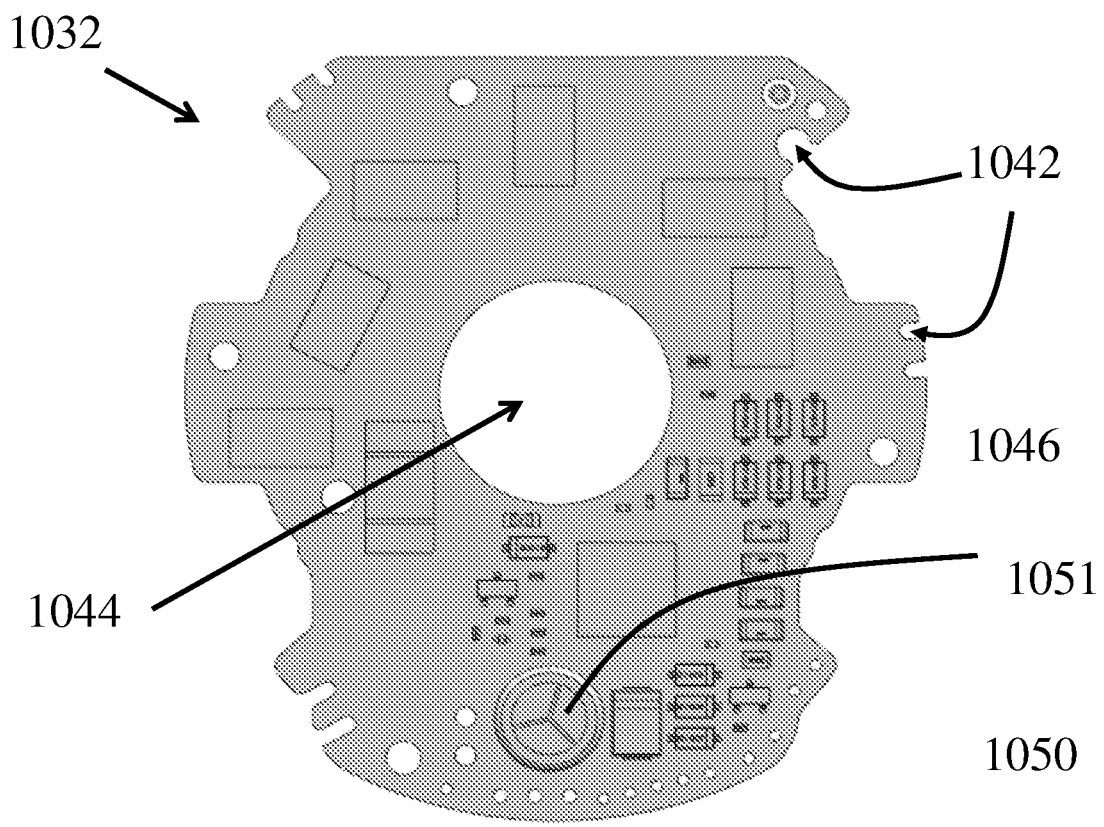
Figure 14C:
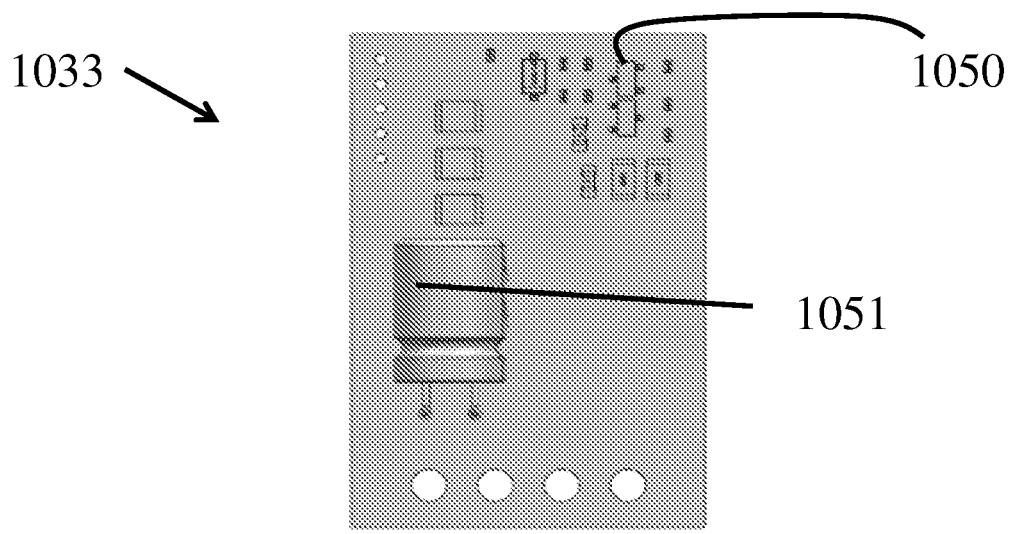
Figure 14D:
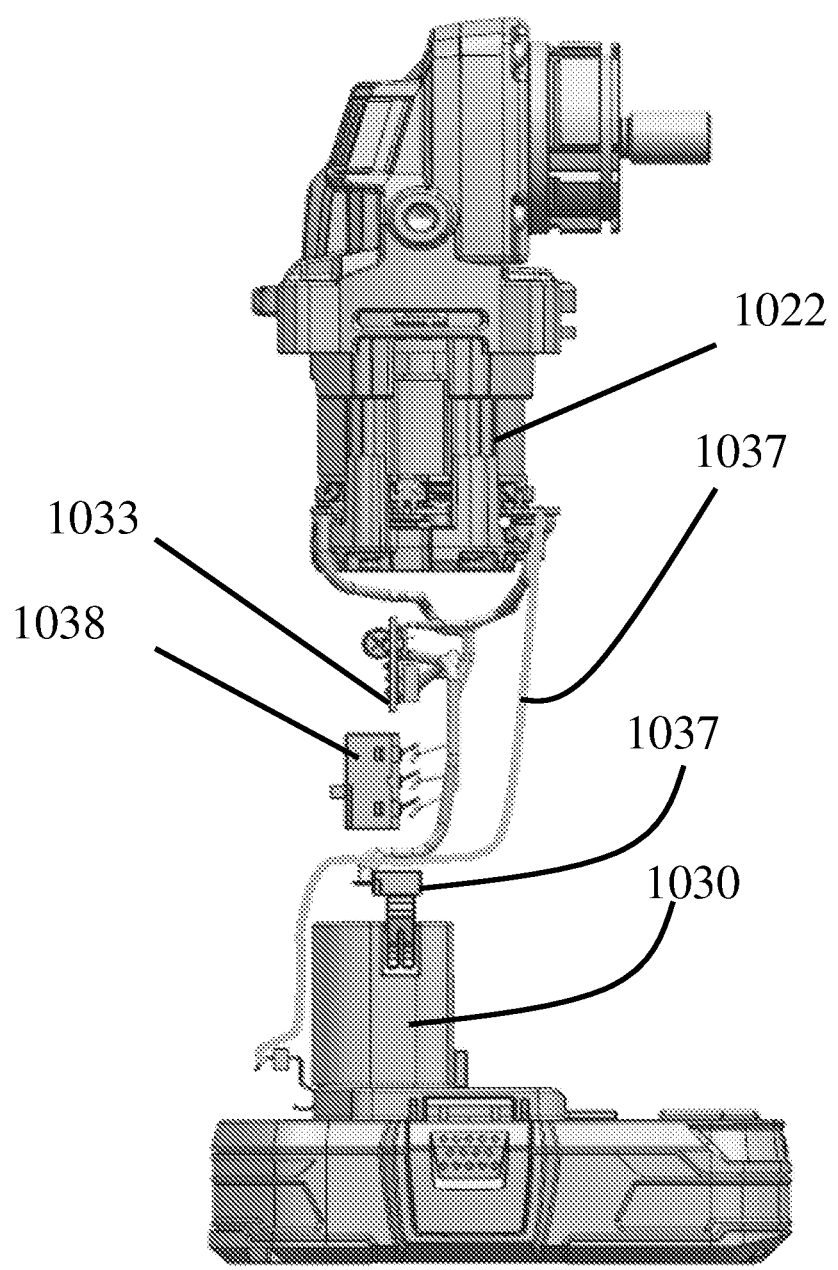

FIG. 14b shows the first circuit board 1032 and FIG. 14c shows the second circuit board 1033. The first circuit board 1032 similar to those mentioned in previous embodiments is a single, integrated circuit board which carries a motor controller for the BLDC motor 1022, as well as other circuit elements for controlling the angle grinder. The first circuit board 1032 has an irregular shape. There is formed a through hole 1044 at the center of the first circuit board 1032 which allows the drive shaft (not shown) of the drive motor 1022 to pass through. On the peripheral rim of the first circuit board 1032, there is a plurality of vias 1042. The circuit components carried on the circuit board 1032 include SMT components 1050, non-SMT components 1051, as well as a microcontroller 1046. The second circuit board 1033 is in a rectangular shape, and circuit components carried on the second circuit board 1033 also include SMT components 1050 as well as non-SMT components 1051. FIG. 14d shows the circuit connection between the major components. In particular, the switch 1038 and the battery receptacle 1031 are electrically connected to the first circuit board 1032 by electric wires 1037. The battery receptacle 1031 is used to couple to respective terminals on an external battery pack 1030. The electric circuit in the angle grinder operates in a well-known manner so the operation of the circuit will not be described in details here.

Figure 15A:
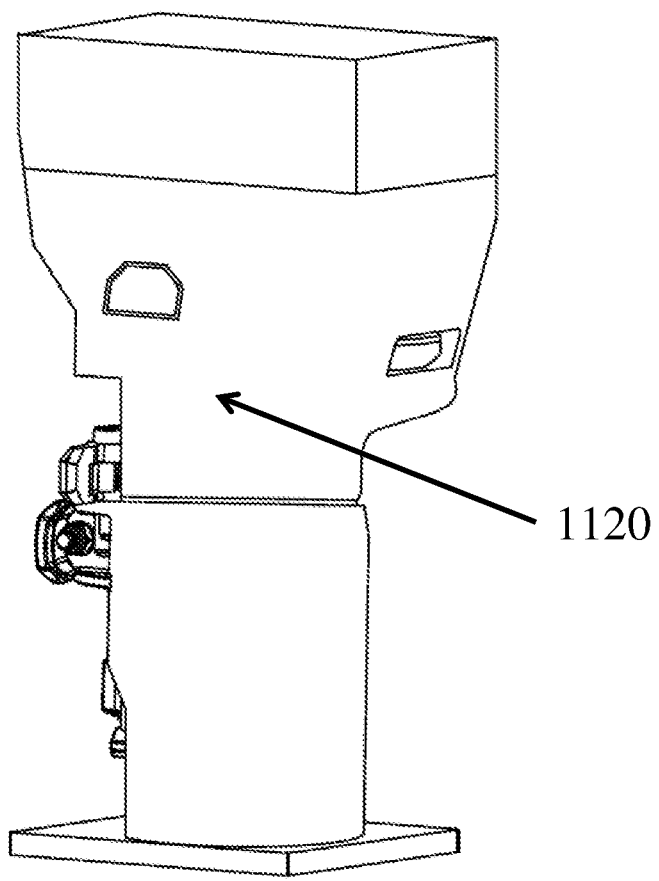
FIG. 15a shows the general appearance of a trim router according to another embodiment of the present invention.
Figure 15B:
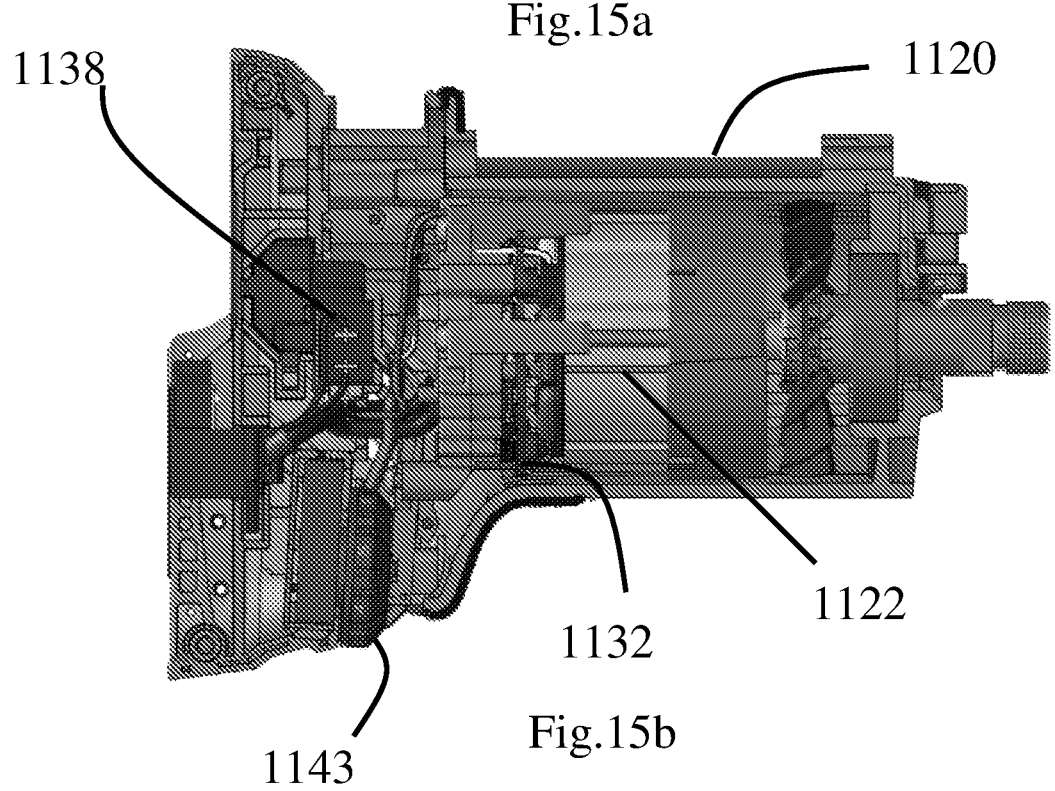
Figure 15C:
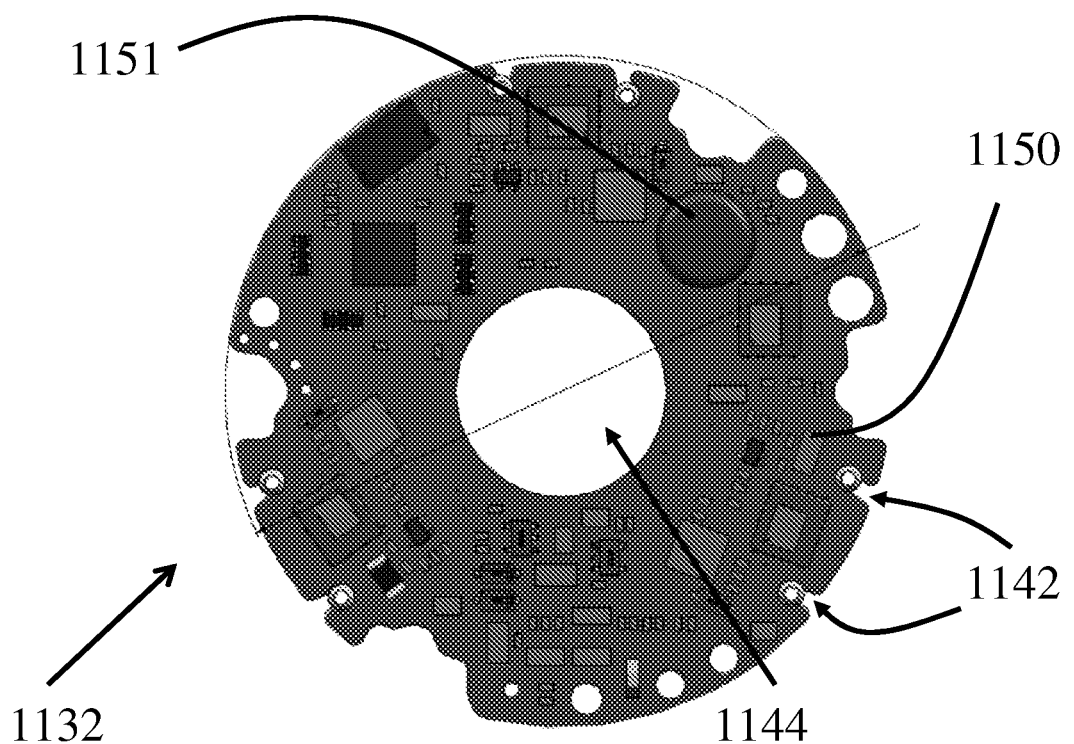
Figure 15D:
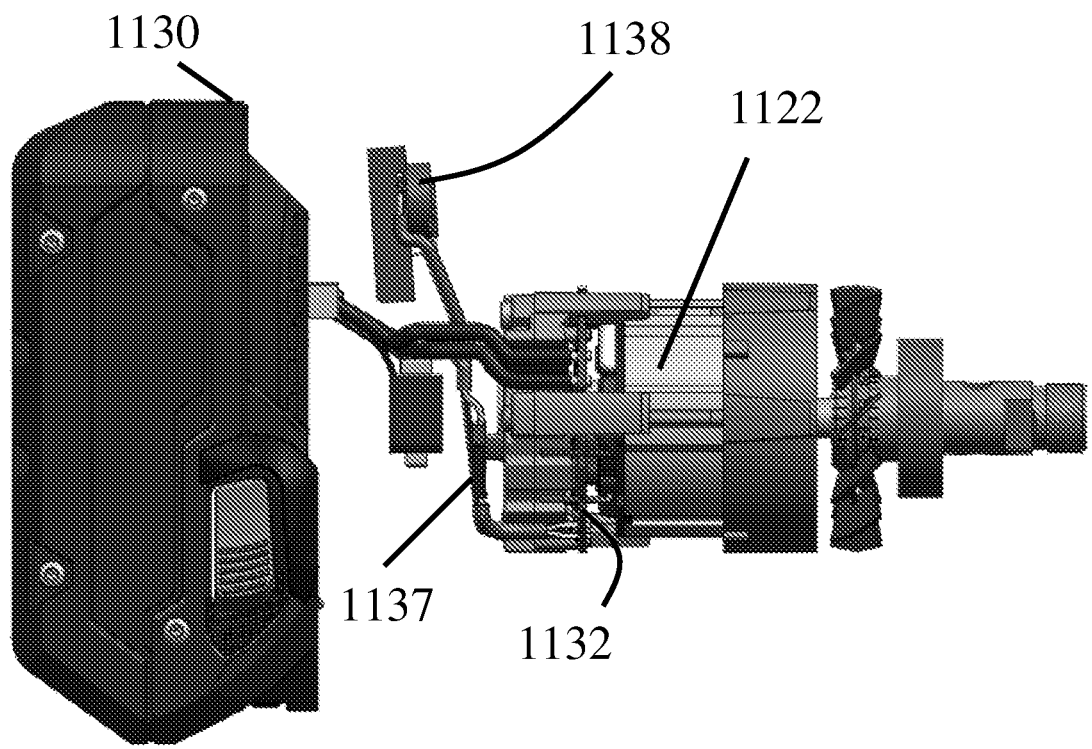

FIGS. 15a-15d show an eleventh embodiment of the present invention which is a handheld trim router. FIG. 15a shows the general appearance of the trim router which includes a main portion 1120. In FIG. 15b, a motor 1122 and other major components are shown to be accommodated in the main portion 1120. The motor 1122 is oriented to be parallel to the longitudinal direction of the main portion 1120. At one end of the motor there is connected a circuit board 1132 which is in a planar shape perpendicular to the motor shaft direction. The circuit board 1132 is connected to a first switch 1138, and a second switch 1143 in the form of a dial. FIG. 15c shows the circuit board 1132 which has a substantially round shape. The circuit board 1132 similar to those mentioned in previous embodiments is a single, integrated circuit board which carries a motor controller for the BLDC motor 1122, as well as other circuit elements for controlling the trim router. There is formed a through hole 1144 at the center of the circuit board 1132 which allows the drive shaft (not shown) of the drive motor 1122 to pass through. On the peripheral rim of the circuit board 1132, there is a plurality of vias 1142. The circuit components carried on the circuit board 1132 include SMT components 1150, as well as non-SMT components 1151. FIG. 15d shows the circuit connection between the major components. In particular, the switch 1138 and the battery receptacle 1131 are electrically connected to the circuit board 1132 by electric wires 1137. The battery receptacle 1131 is used to couple to respective terminals on an external battery pack 1130. The electric circuit in the trim router operates in a well-known manner so the operation of the circuit will not be described in details here.

Figure 16A:
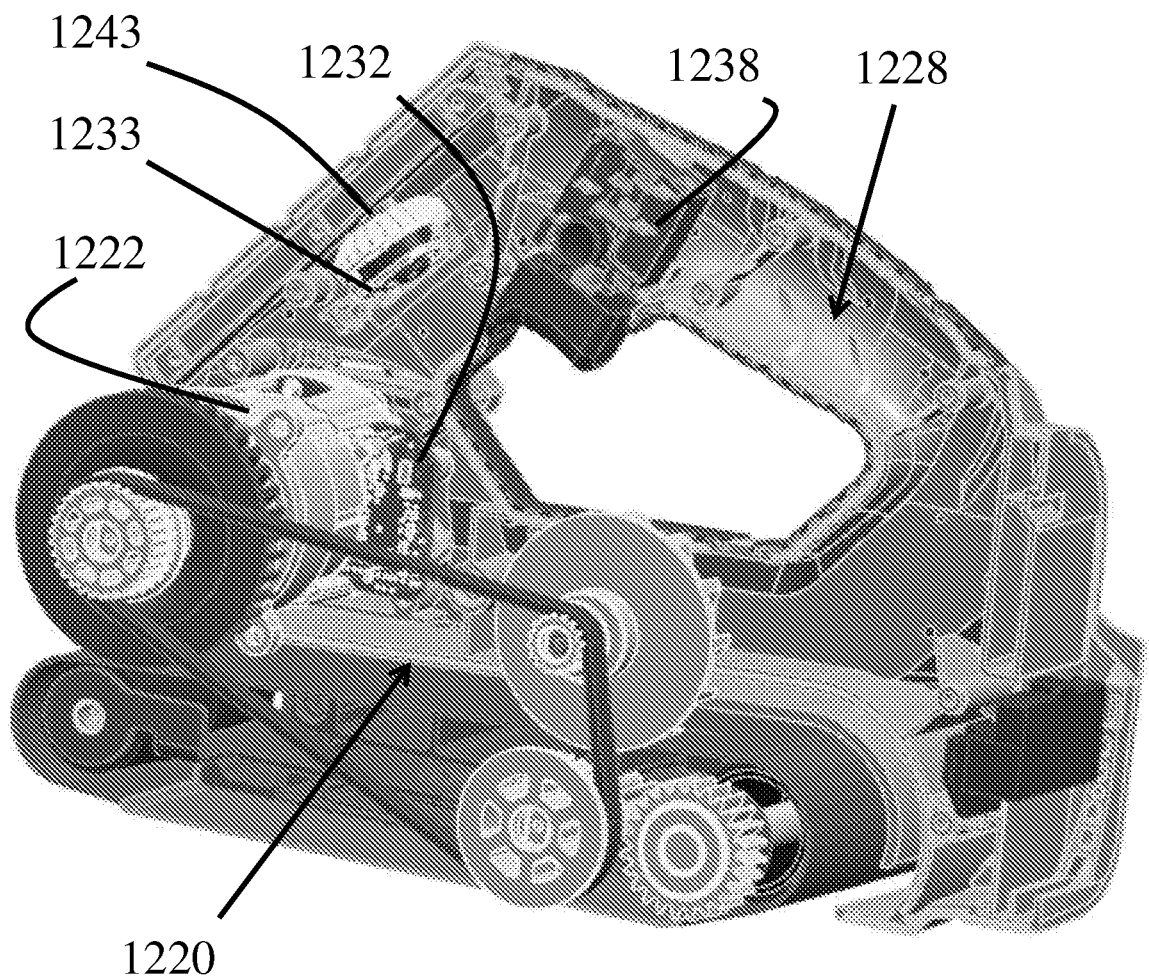
FIG. 16a shows the general appearance of a belt sander with its internal structure according to another embodiment of the present invention.

FIGS. 16a-16f show a twelfth embodiment of the present invention which is a battery-powered belt sander. A part of the belt sander as shown in FIG. 16a includes a handle portion 1228, and a main portion 1220 connected to the handle portion 1228. A motor 1222 is transversely installed in the main portion 1220 with the motor shaft direction perpendicular to the longitudinal direction of the entire belt sander. At one end of the motor there is connected a first circuit board 1232 which extends perpendicular to the motor shaft direction. On the handle portion 1228 there are configured a first switch 1238 and a second switch 1243, both of which are electrically connected to the first circuit board 1232. The second switch 1243 is in the form of a dial, with a second circuit board 1233 connected thereto.

Figure 16B:
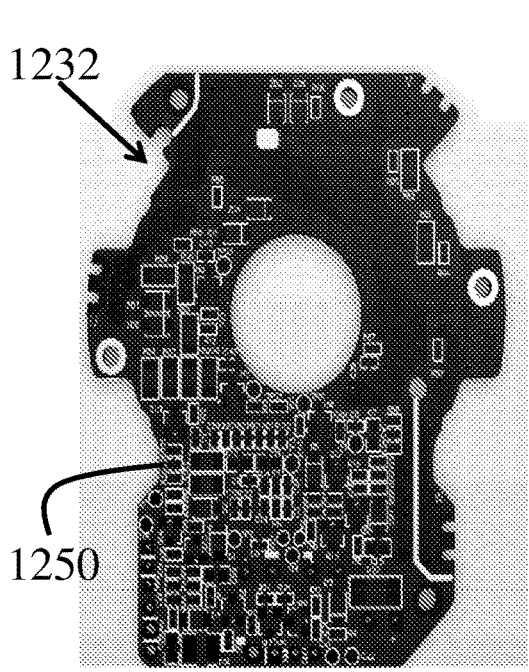
Figure 16C:
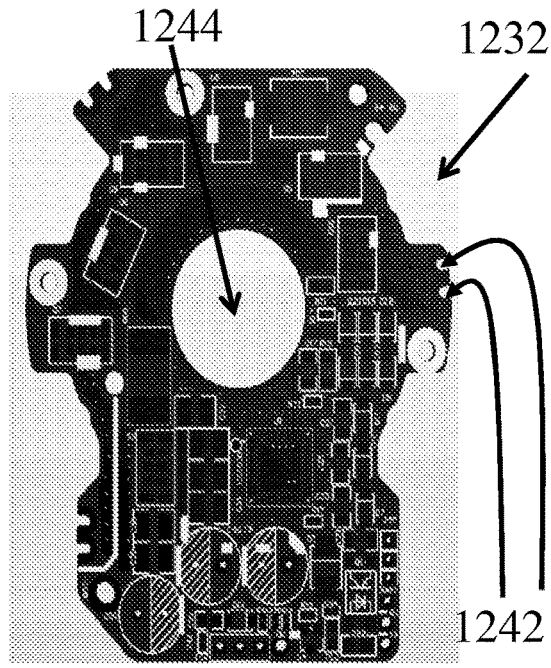
Figure 16D:
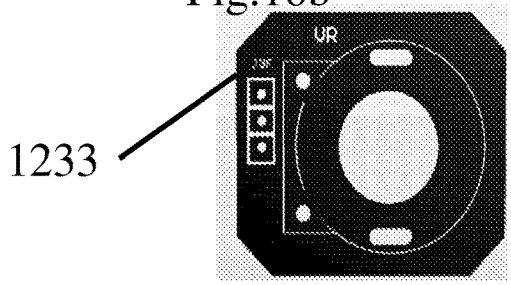
Figure 16E:
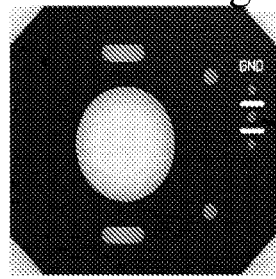

FIGS. 16b-16c show the irregular shape of the first circuit board 1232. The first circuit board 1232 similar to those mentioned in previous embodiments is a single, integrated circuit board which carries a motor controller for the BLDC motor 1222, as well as other circuit elements for controlling the belt sander. The first circuit board 1232 which has an irregular shape consisted of a round part and a substantially rectangular part, similar to those shown in FIG. 4. There is formed a through hole 1244 at the center of the first circuit board 1232 which allows the drive shaft (not shown) of the drive motor 1222 to pass through. On the peripheral rim of the first circuit board 1232, there is a plurality of vias 1242. The circuit components carried on the circuit board 1232 include SMT components 1250. On the other hand, FIGS. 16d-16e show the second circuit board 1233 have a substantially square shape.

Figure 16F:
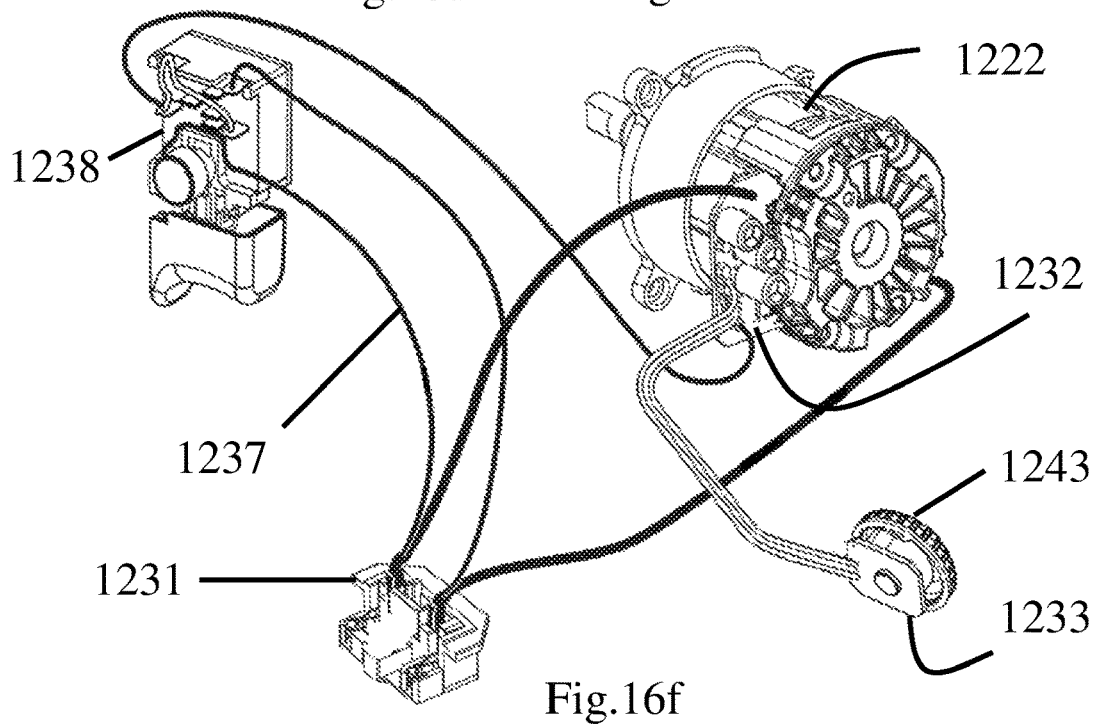

FIG. 16f shows the circuit connection between the major components. In particular, the first switch 1238, the second switch 1243, and a battery receptacle 931 are electrically connected to the first circuit board 1232 by electric wires 1237. The second switch 1243 connects to the first circuit board 1232 via the second circuit board 1233. The battery receptacle 1231 is used to couple to respective terminals on an external battery pack (not shown). The electric circuit in the sander operates in a well-known manner so the operation of the circuit will not be described in details here.

Figure 17A:
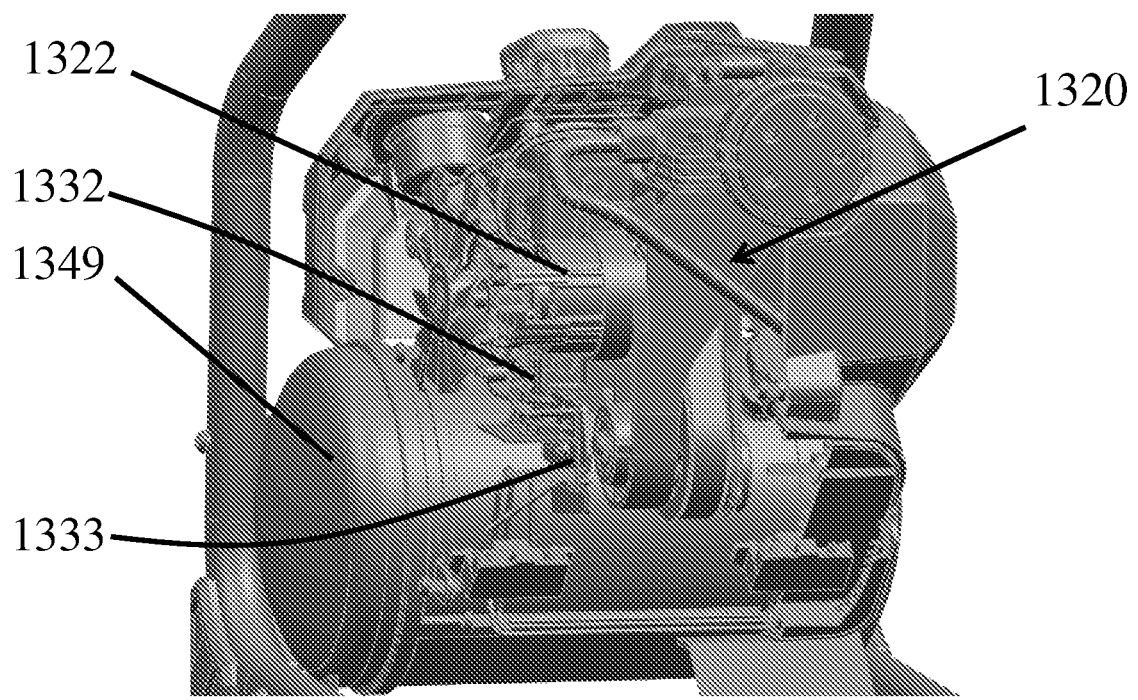
FIG. 17a shows a part of the internal structure of an air compressor according to another embodiment of the present invention.
Figure 17B:
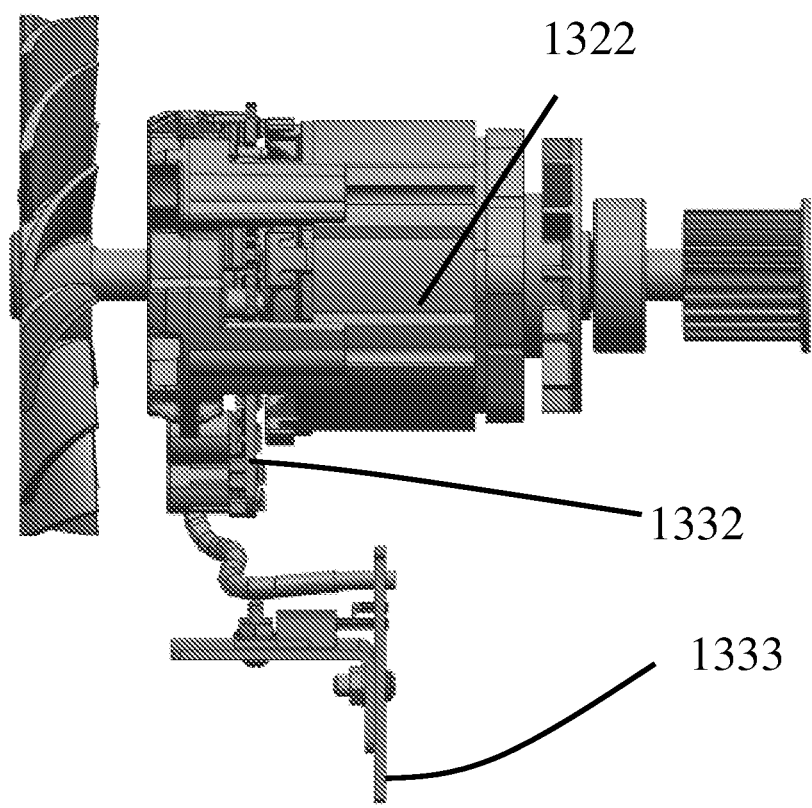

FIGS. 17a-17e show a thirteenth embodiment of the present invention which is a battery-powered 1 gallon compressor. A part of the compressor as shown in FIG. 17a includes an air storage can 1349, and a motor housing 1320 configured above the storage can 1349. A motor 1322 is accommodated within the motor housing 1220, with the motor shaft direction parallel to the longitudinal direction of the storage can 1349. As shown more clearly in FIG. 17b, at one end of the motor there is connected a first circuit board 1332 which extends perpendicular to the motor shaft direction. A second circuit board 1333 is also configured within the motor housing 1320 and electrically connected to the first circuit board 1332. The second circuit board 1333 is used to couple to up to two external battery packs (not shown) and carries out functions such as taking power supply from the battery packs and performing data communication with the battery pack circuit.

Figure 17C:
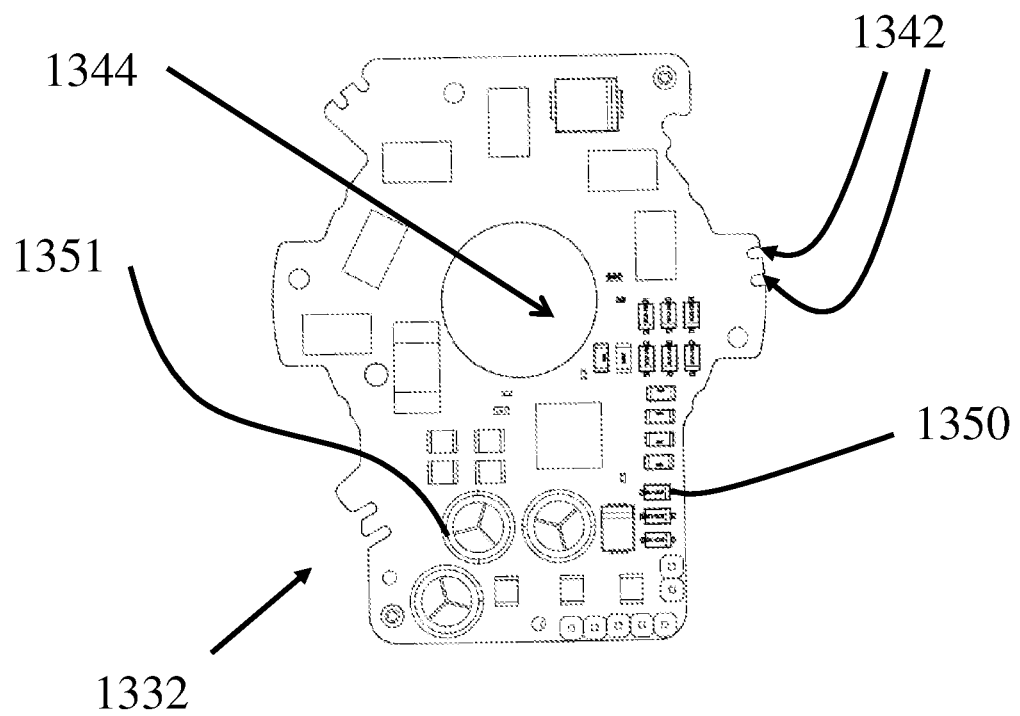
Figure 17D:
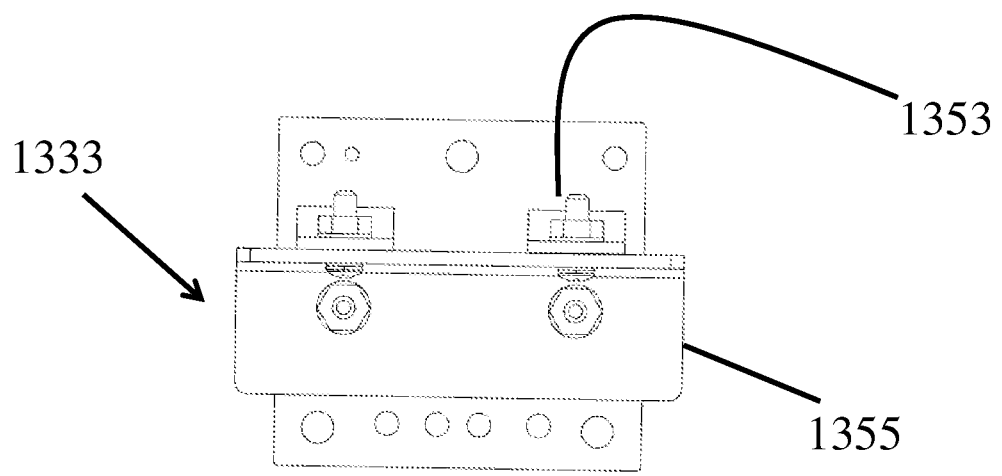

FIG. 17c shows the irregular shape of the first circuit board 1332. The first circuit board 1332 similar to those mentioned in previous embodiments is a single, integrated circuit board which carries a motor controller for the BLDC motor 1322, as well as other circuit elements for controlling the compressor. The first circuit board 1332 has an irregular shape. There is formed a through hole 1344 at the center of the first circuit board 1332 which allows the drive shaft (not shown) of the drive motor 1322 to pass through. On the peripheral rim of the first circuit board 1332, there is a plurality of vias 1342. The circuit components carried on the circuit board 1332 include SMT components 1350 and non-SMT components 1351. On the other hand, FIG. 17d shows the second circuit board 1333 having a substantially T shape with one piece of board 1353 extended vertically from the surface of another piece of board 1355.

Figure 17E:
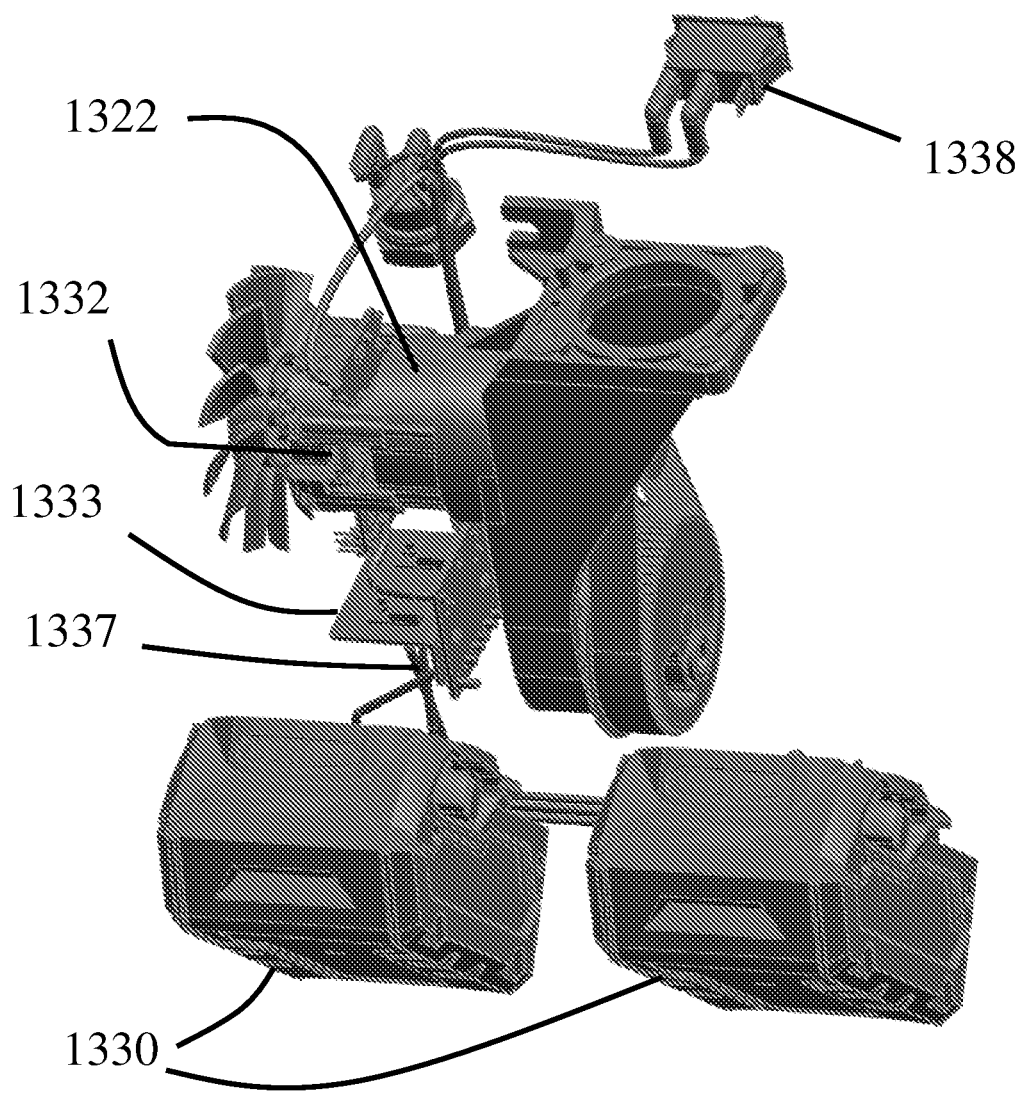

FIG. 17e shows the circuit connection between the major components. In particular, a switch 1338 is electrically connected to the first circuit board 1332 by electric wires 1337. Two power tool battery packs 1330 connect to the second circuit board 1333 also via electric wires 1337, where the second circuit board 1333 is in turn connected to the first circuit board 1332. The electric circuit in the compressor operates in a well-known manner so the operation of the circuit will not be described in details here.

Figure 18A:
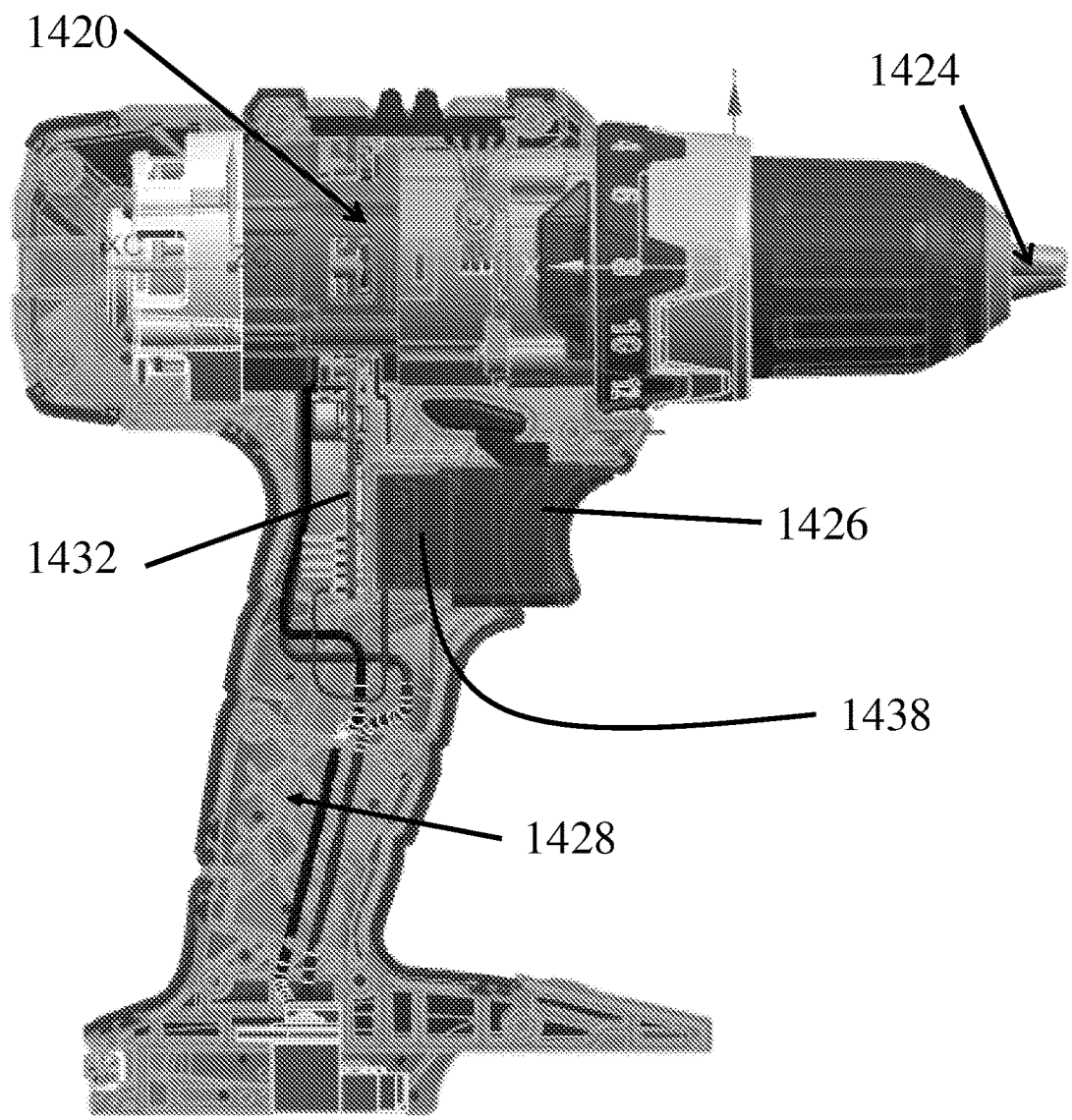
FIG. 18a is a side view showing the internal structure of a hammer drill according to another embodiment of the present invention.
Figure 18B:
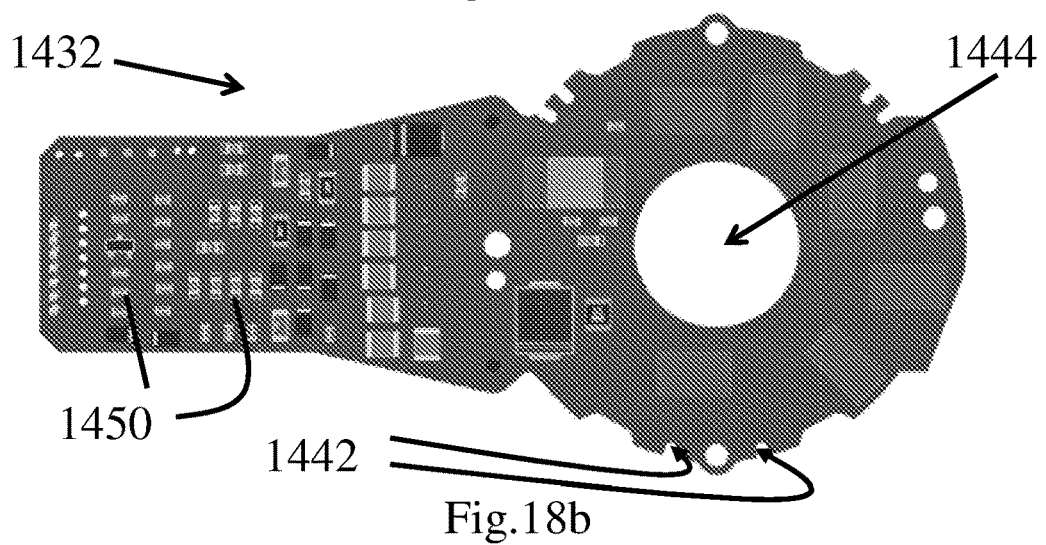
Figure 18C:
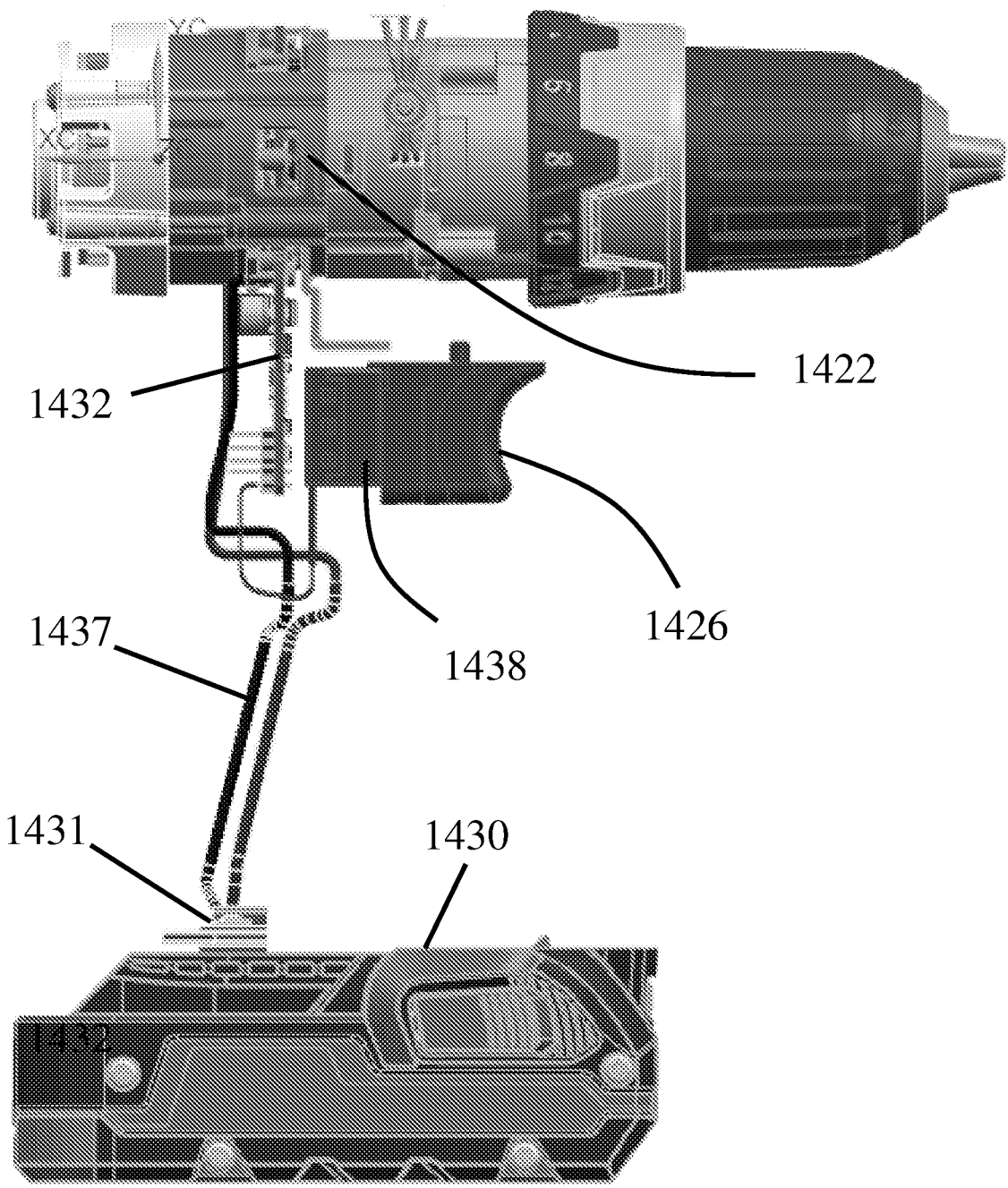

FIGS. 18a-18c show a fourteenth embodiment of the present invention which is a battery-powered brushless rotary hammer drill. The drill as shown in FIG. 18a includes a handle portion 1428, and a main portion 1420 connected to the handle portion 1428. At the front end of the main portion 1420 there is a blade holder 1424 driven by a motor 1422. The motor 1422 is arranged to be along the longitudinal direction of the main portion 1420. At one end of the motor there is connected a circuit board 1432 which extends perpendicular to the motor shaft direction. The circuit board 1432 similar to those mentioned in previous embodiments is a single, integrated circuit board which carries a motor controller for the BLDC motor 1422, as well as other circuit elements for controlling the drill. On the handle portion 1428, there is configured a trigger 1426 which is connected to and adapted to drive a switch 1438.

FIG. 18b shows the front view of the circuit board 1432 which has an irregular shape consisted of a round part and a substantially rectangular part, similar to those shown in FIG. 4. The circuit board 1432 is formed with a through hole 1444 at the center thereof which allows the drive shaft (not shown) of the drive motor 1422 to pass through. On the peripheral rim of the circuit board 1432, there is a plurality of vias 1442. The circuit components carried on the circuit board 1432 are SMT components 1450. FIG. 18c shows the circuit connection between the major components. In particular, the switch 1438 and a battery receptacle 1431 are both electrically connected to the circuit board 1432 by electric wires 1437. The spring-biased trigger 1426 is connected to the switch 1438. The battery receptacle 1431 is used to couple to respective terminals on an external battery pack 1430. The electric circuit in the drill operates in a well-known manner so the operation of the circuit will not be described in details here.

Figure 19A:
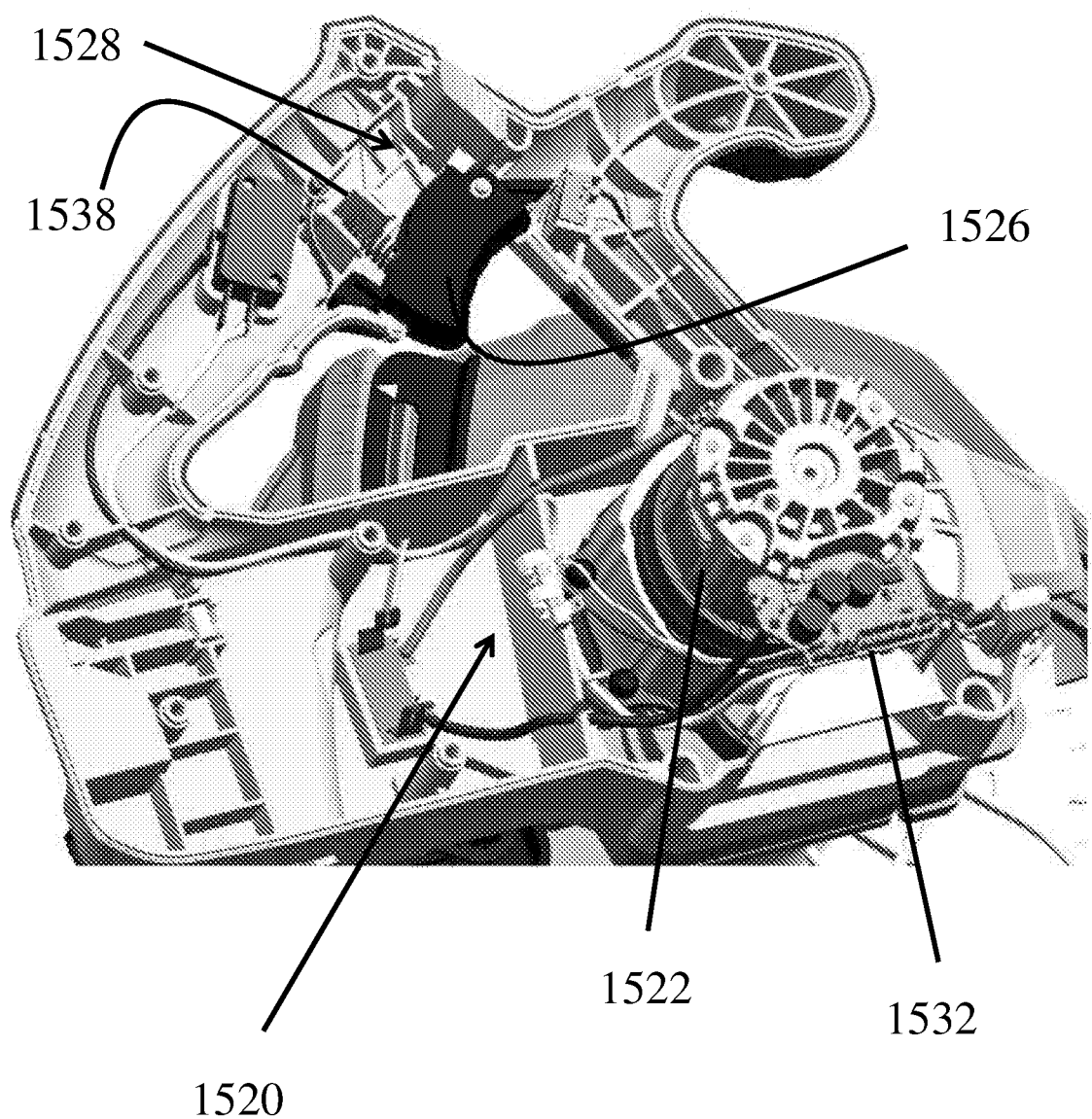
FIG. 19a shows a part of the internal structure of a circular saw according to another embodiment of the present invention.
Figure 19B:
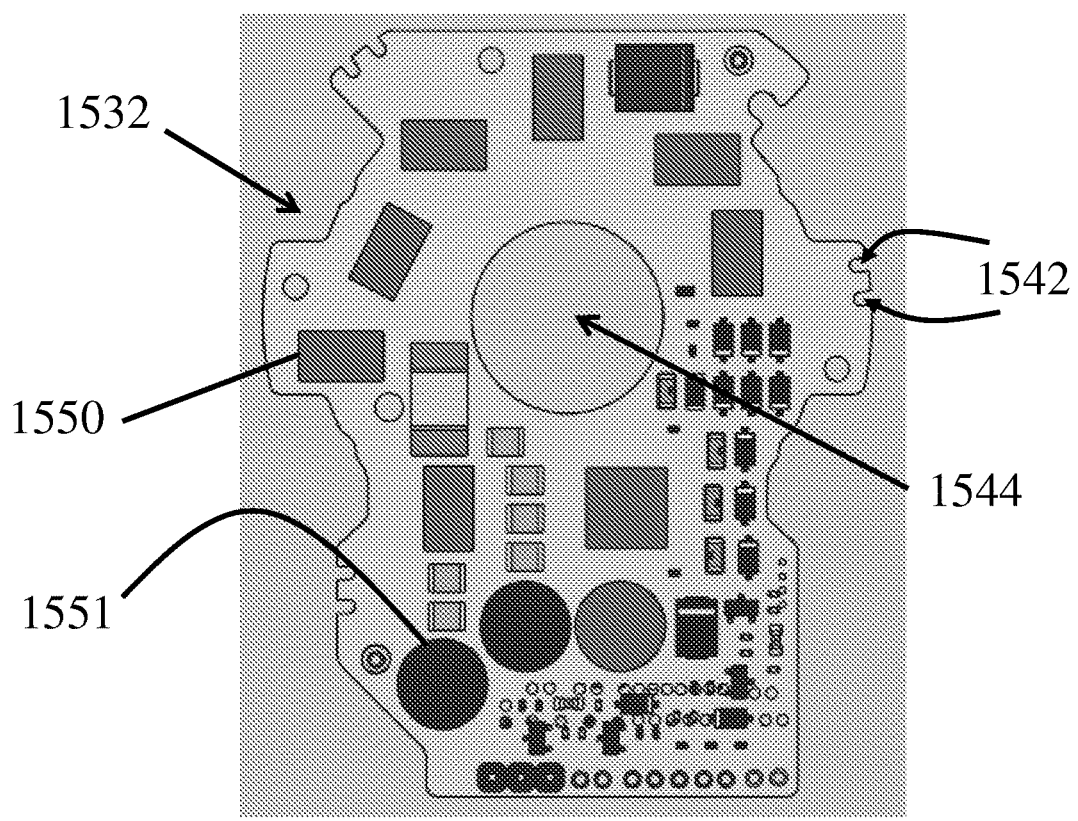
Figure 19C:
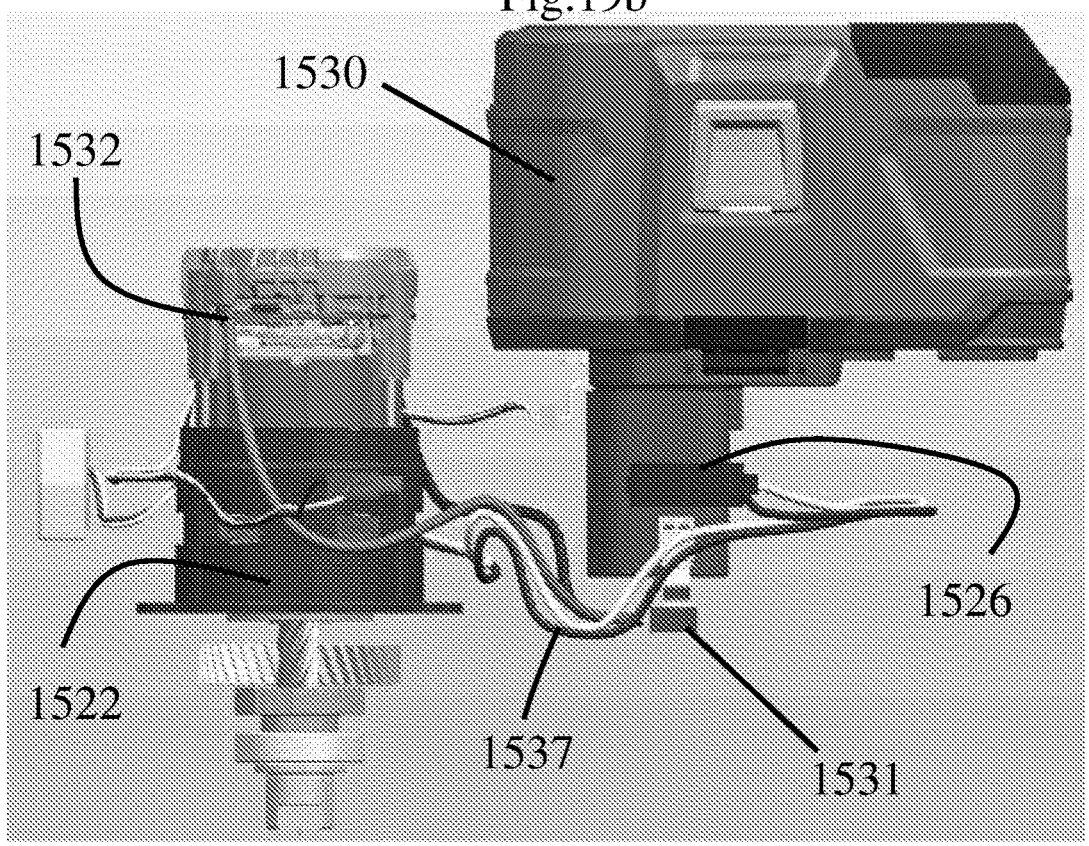

FIGS. 19a-19c show a fifteenth embodiment of the present invention which is a battery-powered circular saw. The circular saw as shown in FIG. 19a includes a handle portion 1528, and a main portion 1520 connected to the handle portion 1528. The motor 1522 is arranged in the main portion 1520 with its shaft direction perpendicular to the longitudinal direction of the handle portion 1528. At one end of the motor there is connected a circuit board 1532 which extends perpendicular to the motor shaft direction. The circuit board 1532 similar to those mentioned in previous embodiments is a single, integrated circuit board which carries a motor controller for the BLDC motor 1522, as well as other circuit elements for controlling the circular saw. On the handle portion 1528, there are configured a trigger 1526 which is connected to and adapted to drive a switch 1538.

FIG. 19b shows the front view of the circuit board 1532 which has an irregular shape. The circuit board 1532 is formed with a through hole 1544 at the center thereof which allows the drive shaft (not shown) of the drive motor 1522 to pass through. On the peripheral rim of the circuit board 1532, there is a plurality of vias 1542. The circuit components carried on the circuit board 1532 are SMT components 1550 as well as non-SMT components 1551. FIG. 19c shows the circuit connection between the major components. In particular, the switch 1538 and a battery receptacle 1431 are both electrically connected to the circuit board 1532 by electric wires 1537. The spring-biased trigger 1526 is connected to the switch 1538. The battery receptacle 1531 is used to couple to respective terminals on an external battery pack 1530. The electric circuit in the circular saw operates in a well-known manner so the operation of the circuit will not be described in details here.

Figure 20A:
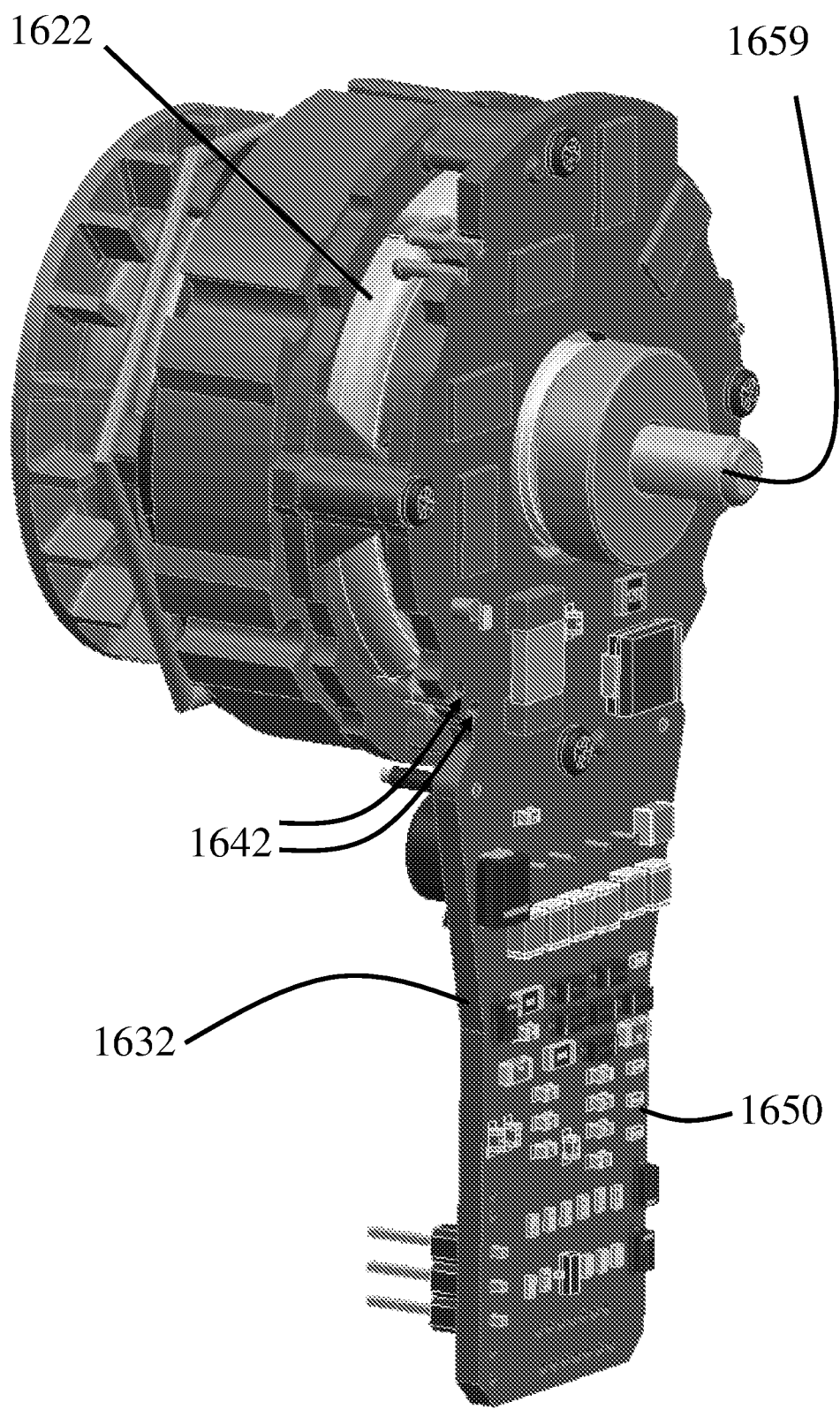
FIG. 20a shows a brushless motor with an integrated circuit board according to another embodiment of the present invention.
Figure 20B:
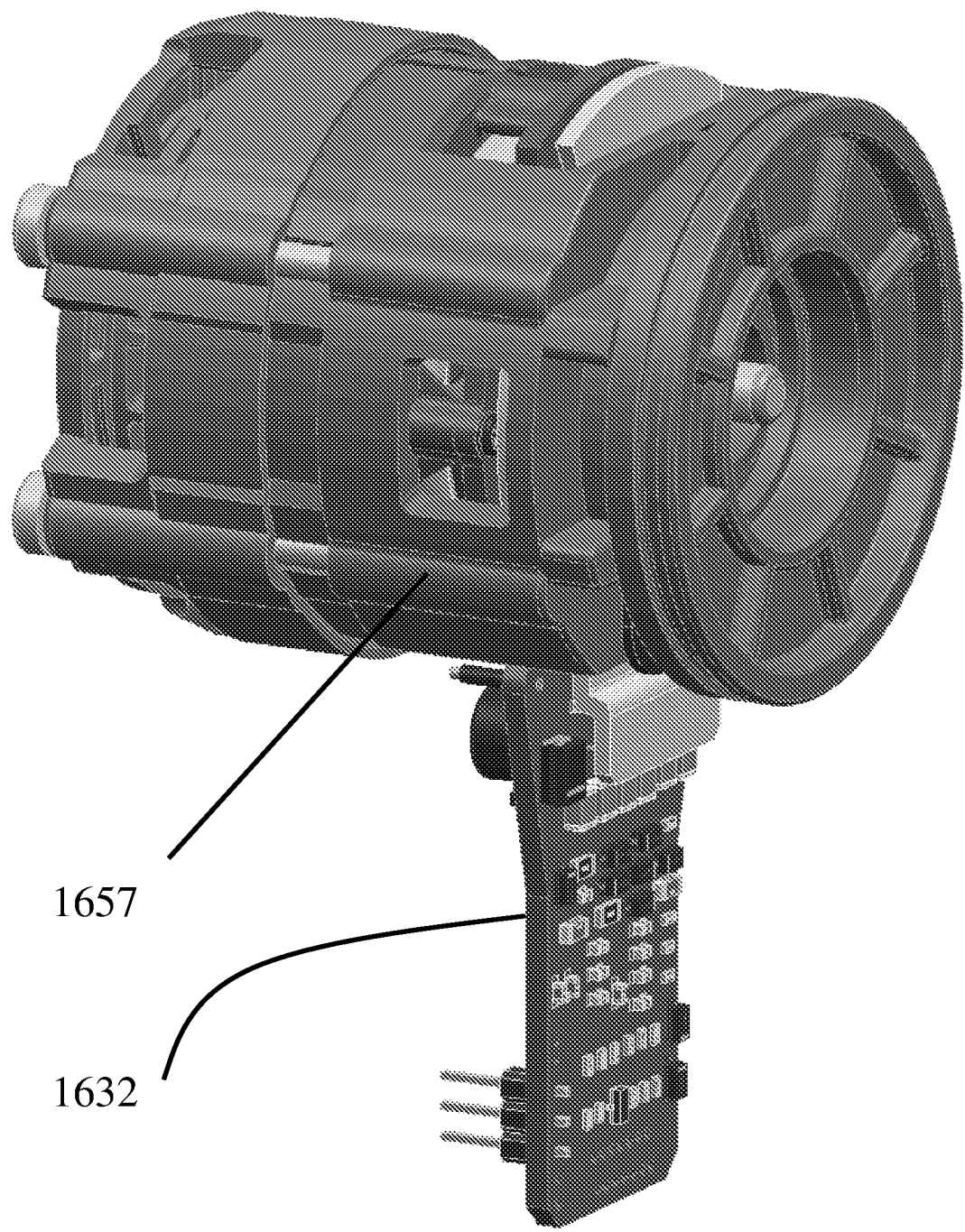
FIG. 20b shows the brushless motor in FIG. 20a partially accommodated in a motor casing.

Now turn to FIGS. 20a-20b. In a sixteenth embodiment of the present invention an all-in-one brushless motor assembly contains a circuit board 1632 coupled to the motor 1622. The circuit board 1632 similar to those mentioned in previous embodiments is a single, integrated circuit board which carries a motor controller for the BLDC motor 1622, as well as other circuit elements for controlling the compressor. The circuit board 1632 which has an irregular shape consisted of a round part and a substantially rectangular part, similar to those shown in FIG. 4. There is formed with a through hole 1644 at the center thereof which allows the drive shaft 1659 of the drive motor 1622 to pass through. On the peripheral rim of the circuit board 1632, there is a plurality of vias 1642. The circuit components carried on the circuit board 1632 include SMT components 1650. The BLDC motor can preferably be protected by a motor casing 1657 as shown in FIG. 20b, with part of the circuit board 1632 exposed outside of the motor casing 1657.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, the shape of the circuit board described above is a combination of circular ring and a rectangular. However, those skilled in the art should realize that other shapes of circuit board may also be used depending on the actual design requirements of the power tool.

We claim:

1. A power tool, the power tool comprising:
   a casing;
   a drive motor mounted inside the casing, the drive motor adapted to drive one or more movable parts in the power tool, wherein the drive motor includes a drive shaft defining an axial direction;
   a gear mechanism mounted inside the casing and located in front of the drive motor in the axial direction, wherein the gear mechanism is configured to convert an output from the drive motor to a different rating;
   a user actuated switch mounted on the casing; and
   a circuit board mounted inside the casing, the circuit board being integrated with a motor controller for the drive motor and a microcontroller for controlling operation of the power tool, wherein the circuit board is mechanically connected to the drive motor and the user actuated switch at the same time, and wherein the circuit board is located between the drive motor and the gear mechanism along the axial direction;
   wherein
      the casing comprises a main portion extending substantially along the axial direction and a handle portion connected and extending from the main portion along a direction not parallel with the axial direction, and
      the circuit board comprises a first portion and a second portion which are accommodated in the main portion and the handle portion respectively.

2. The power tool of claim 1, wherein:
   the circuit board is secured to the drive motor in a way such that the circuit board is perpendicular to the axial direction.

3. The power tool of claim 1, wherein the circuit board further comprises a plurality of vias which are adapted to receive struts on the drive motor, such that the circuit board is securely mounted on the drive motor and electrically connected thereto.

4. The power tool of claim 1, wherein the circuit board further comprises a plurality of vias which are adapted to receive struts formed on the casing, such that the circuit board is securely mounted on the casing.

5. The power tool of claim 1, wherein the circuit board further comprises a conducting pad which is in direct contact with the user actuated switch, where the user actuated switch is electrically connected with the conducting pad.

6. The power tool of claim 1, wherein:
   the first portion of the circuit board is in a circular shape with a through hole at its center to allow the drive shaft to pass; and
   the second portion of the circuit board is in a rectangular shape.

7. The power tool of claim 1 further comprising a trigger configured on the casing and exposed to the outside, the trigger mechanically connected to the user actuated switch.

8. The power tool of claim 1, wherein the circuit board is the only circuit board configured in the power tool.

9. A power tool, the power tool comprising:
   a casing;

a drive motor mounted inside the casing, the drive motor adapted to drive one or more movable parts in the power tool, wherein the drive motor includes a drive shaft defining an axial direction;

a gear mechanism mounted inside the casing and located in front of the drive motor in the axial direction, wherein the gear mechanism is configured to convert an output from the drive motor to a different rating;

a user actuated switch mounted on the casing; and a circuit board mounted inside the casing, the circuit board being integrated with a motor controller for the drive motor and a microcontroller for controlling operation of the power tool, wherein the circuit board is mechanically connected to the drive motor and the user actuated switch at the same time, and wherein the circuit board is located between the drive motor and the gear mechanism along the axial direction;

wherein a Hall sensor, a power control device, and a logic controller are integrated into the circuit board.

10. The power tool of claim 9, wherein:
the circuit board is secured to the drive motor in a way such that the circuit board is perpendicular to the axial direction.

11. The power tool of claim 9, wherein the circuit board further comprises a plurality of vias which are adapted to receive struts on the drive motor, such that the circuit board is securely mounted on the drive motor and electrically connected thereto.

12. The power tool of claim 9, wherein the circuit board further comprises a plurality of vias which are adapted to receive struts formed on the casing, such that the circuit board is securely mounted on the casing.

13. The power tool of claim 9, wherein the circuit board further comprises a conducting pad which is in direct contact with the user actuated switch, where the user actuated switch is electrically connected with the conducting pad.

14. The power tool of claim 9, wherein:
the casing comprises a main portion extending substantially along the axial direction and a handle portion connected and extending from the main portion along a direction not parallel with the axial direction, and
the circuit board comprises a first portion and a second portion which are accommodated in the main portion and the handle portion respectively.

15. The power tool of claim 14, wherein:
the first portion of the circuit board is in a circular shape with a through hole at its center to allow the drive shaft to pass; and
the second portion of the circuit board is in a rectangular shape.

16. The power tool of claim 9 further comprising a trigger configured on the casing and exposed to the outside, the trigger mechanically connected to the user actuated switch.

17. The power tool of claim 9, wherein the circuit board is the only circuit board configured in the power tool.

18. A power tool, the power tool comprising:
a casing;
a drive motor mounted inside the casing, the drive motor adapted to drive one or more movable parts in the power tool, wherein the drive motor includes a drive shaft defining an axial direction;

a gear mechanism mounted inside the casing and located in front of the drive motor in the axial direction, wherein the gear mechanism is configured to convert an output from the drive motor to a different rating;

a user actuated switch mounted on the casing; and a circuit board mounted inside the casing, the circuit board being the only circuit board in the power tool, wherein the circuit board is located between the drive motor and the gear mechanism along the axial direction.

19. The power tool of claim 18, wherein:
the circuit board is secured to the drive motor in a way such that the circuit board is perpendicular to the axial direction.

20. The power tool of claim 19, wherein:
the casing comprises a main portion extending substantially along the axial direction and a handle portion connected and extending from the main portion along a direction not parallel with the axial direction; and
the circuit board comprises a first portion and a second portion which are accommodated in the main portion and the handle portion respectively.

21. The power tool of claim 20, wherein the circuit board further comprises a plurality of vias which are adapted to receive struts on the drive motor, such that the circuit board is securely mounted on the drive motor and electrically connected thereto.

22. The power tool of claim 20, wherein the circuit board further comprises a plurality of vias which are adapted to receive struts formed on the casing, such that the circuit board is securely mounted on the casing.

23. The power tool of claim 20, wherein the circuit board further comprises a conducting pad which is in direct contact with the user activated actuated switch, where the user activated actuated switch is electrically connected with the conducting pad.

24. The power tool of claim 20, wherein:
the first portion of the circuit board is in a circular shape with a through hole at its center to allow the drive shaft to pass; and
the second portion of the circuit board is in a rectangular shape.

25. The power tool of claim 18 further comprising a trigger configured on the casing and exposed to the outside, the trigger mechanically connected to the user activated actuated switch.

26. The power tool of claim 18, wherein a Hall sensor, a power control device, and a logic controller are integrated into the circuit board.

27. The power tool of claim 18, wherein the circuit board is mechanically connected to the drive motor and the user actuated switch at the same time.

* * * * *